US011042898B2

(12) United States Patent
Mehanian et al.

(10) Patent No.: US 11,042,898 B2
(45) Date of Patent: Jun. 22, 2021

(54) CLICKSTREAM PURCHASE PREDICTION USING HIDDEN MARKOV MODELS

(71) Applicant: Staples, Inc., Framingham, MA (US)

(72) Inventors: Courosh Mehanian, Redmond, WA (US); Tchavdar Dangaltchev, Bellevue, WA (US); Karthik Kumara, Santa Clara, CA (US); Jing Pan, Foster City, CA (US); Timothy Wee, Burlingame, CA (US)

(73) Assignee: Staples, Inc., Framingham, MA (US)

( * ) Notice: Subject to any disclaimer, the term of this patent is extended or adjusted under 35 U.S.C. 154(b) by 1027 days.

(21) Appl. No.: 14/580,220

(22) Filed: Dec. 23, 2014

(65) Prior Publication Data

US 2015/0269609 A1 Sep. 24, 2015

Related U.S. Application Data

(60) Provisional application No. 61/954,931, filed on Mar. 18, 2014.

(51) Int. Cl.
*G06Q 30/02* (2012.01)

(52) U.S. Cl.
CPC ................................ *G06Q 30/0246* (2013.01)

(58) Field of Classification Search
CPC .................................................. G06Q 30/0246
See application file for complete search history.

(56) References Cited

U.S. PATENT DOCUMENTS 5,787,198 A * 7/1998 Agazzi ................. G06K 9/6297 382/196
2002/0194058 A1 12/2002 Eldering
2009/0024555 A1 * 1/2009 Rieck ........................ G06F 7/02 706/54
2009/0164395 A1 * 6/2009 Heck ..................... G06F 16/954 706/16
2010/0114654 A1 * 5/2010 Lukose .................. G06Q 30/00 705/14.54

(Continued)

FOREIGN PATENT DOCUMENTS

WO 2008030670 3/2008
WO WO-2008030670 A1 * 3/2008 ............. G06Q 30/02

OTHER PUBLICATIONS

Wiley Encyclopedia of Computer Science and Engineering (Year: 2009).*

(Continued)

*Primary Examiner* — Breffni Baggot
(74) *Attorney, Agent, or Firm* — VLP Law Group, LLP

(57) ABSTRACT

Technology for predicting online user shopping behavior, such as whether a user will purchase a product, is described. An example method includes receiving current session data describing a current session for a current user, extracting a current clickstream from the current session data classifying the current clickstream as a purchase clickstream or a non-purchase clickstream by processing the current click-stream using one or more sets of Hidden Markov Model parameters produced by one or more Hidden Markov Models, and computing, using the one or more computing devices, a purchase probability that the current user will purchase a product during the current session based on the classifying.

19 Claims, 16 Drawing Sheets

| | State 0 | State 1 |
|---|---|---|
| State 0 | 0.8 | 0.2 |
| State 1 | 0.4 | 0.6 |

(56) References Cited

U.S. PATENT DOCUMENTS

| | | | | |
|---|---|---|---|---|
| 2010/0317420 | A1* | 12/2010 | Hoffberg | G06Q 30/0207 463/1 |
| 2011/0106641 | A1 | 5/2011 | Vogel et al. | |
| 2012/0011530 | A1 | 1/2012 | Bentolila et al. | |
| 2012/0036037 | A1 | 2/2012 | Xiao et al. | |
| 2012/0109710 | A1* | 5/2012 | Rahman | G06Q 30/0202 705/7.31 |
| 2013/0132226 | A1 | 5/2013 | Abbas | |
| 2014/0067597 | A1 | 3/2014 | Kirkby et al. | |
| 2014/0258275 | A1 | 9/2014 | Paritosh | |

OTHER PUBLICATIONS

Alan L. Montgomery, "Predicting Online Purchase Conversion Using Web Path" Marketing Science Conference, University of Alberta, Canada (Year: 2002).*

Richard O. Duda, "Pattern Classification", 2nd edition Wiley (Year: 2000).*

Alan L. Montgomery, Modeling Online Browsing and Path Analysis using Clickstream Data Marketing Science, 2004, vol. 23, issue 4, 579-595 (Year: 2004) (Year: 2004).*

A Joint Model of Usage and Churn in Contractual Settings, Eva Ascarza, Bruce G. S. Hardie, Marketing Science, vol. 32, No. 4 (Jul.-Aug. 2013), pp. 570-590 (Year: 2013).*

University of Chicago Press, Bayesian Statistics and Marketing, Peter Rossie & Robert McCulloch, Marketing Science pp. 304-328 (Year: 2003).*

University of Chicago, Patrick Billingsley, "Statistical Methods in Markov Chains", The Annals of Mathematical Statistics vol. 32, No. 1 (Mar. 1961), pp. 12-40 (Year: 1961).*

International Search Report & Written Opinion for PCT/US2015/021348, dated Jun. 25, 2015.

Wikipedia, the free encyclopedia, "Hidden Markov model", http://en.wikipedia.org/w/index.php?title=Hidden_Markov_model&oldid=625801767, Sep. 16, 2014 (12 pages).

Moe, Buying, Searching, or Browsing: Differentiating Between Online Shoppers Using In-Store Navigational Clickstream, 2003, Journal of Consumer Psychology, vol. 13, p. 29-39.

Poel, Predicting Online-Purchase Behaviour, Oct. 16, 2005, European Journal of Operational Research, vol. 166, p. 557-575.

Wu, Prediction of the Intention of Purchase of the User Surfing on the Web Using Hidden Markov Model, Jan. 1, 2005, Proceedings of ICSSSM, vol. 1, p. 387-390.

* cited by examiner

Transition Probability Matrix
150

Final State
154

| Initial State 152 | State 0 | State 1 |
| --- | --- | --- |
| State 0 | 0.8 | 0.2 |
| State 1 | 0.4 | 0.6 |

Figure 1B

Sample Output 190

192

194

Emission: HSSCSPCPP

State Path: 000001111

| Symbol | Page | Description |
| --- | --- | --- |
| H | Home Page | The home page is a common starting point for online sessions. |
| S | Search Results | Search pages present lists of items or categories. |
| A | Account | Account pages are used for login, address change, and to review order status. |
| C | Shopping Cart | Add or delete products and enter purchase information. |
| O | Order | Order confirmation page. |
| I | Out-of-Stock | Information about items that are out of stock. |
| P | Product-Info | Product information, item description, price, availability, and product reviews. |
| F | Favorite | Add to favorite list and view favorite lists. |
| D | Coupon | Email coupon, instant savings coupon, coupon code. |
| L | List or Category | List or Category page. |
| E | Exit | Navigate outside of website domain. |
| X | Other | Miscellaneous other pages. |

CLICKSTREAM PURCHASE PREDICTION USING HIDDEN MARKOV MODELS

CROSS-REFERENCE TO RELATED APPLICATIONS

This application claims the benefit under 35 U.S.C. § 119(e) of U.S. Provisional Patent Application No. 61/954,931, entitled "Clickstream Purchase Prediction Using Hidden Markov Models" and filed Mar. 18, 2014, the entire contents of which are incorporated herein by reference.

BACKGROUND

1. Field of the Art

The present specification generally relates to the field of processing inputs on the Internet. More specifically, the present specification relates in some cases to a system and method for clickstream purchase prediction using Hidden Markov Models (HHMs).

2. Description of the Related Art

The use of the internet to promote and sell products has proliferated in recent years to the point where it accounts for a significant percentage of retail sales. There are a number of companies that monitor interactions of users to measure engagement with web sites including whether the interactions result in sales. In fact, search terms and web site domains are commonly used to determine which advertisements to present to users. These companies also measure the cost per impression, cost per click, or cost per order. Entire industries have been developed around measuring user interaction and behavior with web pages.

However, one problem with existing technologies is that they typically only measure user behavior, and do not provide a mechanism to determine the level of user engagement or when to make offers during a session or particular engagement. Most measurements are after the fact, and many ad campaigns are operated on a trial and error basis or using A/B testing. These methods are prevalent in online retail, and in some instances, companies have started to use big data and data modeling. However, the use of clickstreams for data mining and data intelligence is done after the fact for the most part.

Unfortunately, existing methods for measuring user interaction also do not provide guidance as to what offers to make and when to make them to be most effective.

SUMMARY

According to one innovative aspect of the subject matter described in this disclosure, a system includes one or more processors and one or more memories storing instructions. The instructions are executable by the one or more processors to carry out various acts and/or functions. In some implementations, the instructions may include a production encoder module stored by the one or more memories and executable by the one or more processors to receive current session data describing a current session for a current user and extract a current clickstream from the current session data, and a classifier stored by the one or more memories and executable by the one or more processors to classify current session data describing a current session for a current user, extract a current clickstream from the current session data, classify the current clickstream as a purchase clickstream or a non-purchase clickstream by processing the current clickstream using one or more sets of Hidden Markov Model (HMM) parameters produced by one or more HMMs, and compute a purchase probability that the current user will purchase a product during the current session based on the classifying.

These and other implementations may each optionally include one or more of the following elements including that the HMMs include a purchase HMM and a non-purchase HMM; a training encoder module is stored by the one or more memories and executable by the one or more processors to receive clickstreams for past users reflecting past online sessions of the past users; that the clickstreams include purchase clickstreams and non-purchase clickstreams; that the training encoder encodes the clickstreams into encoded clickstreams; a Hidden Markov Model training module is stored by the one or more memories and executable by the one or more processors to train the purchase HMM and the non-purchase HMM based on the encoded clickstreams; that the purchase HMM produces a set of purchase HMM parameters and the non-purchase HMM produces a set of non-purchase HMM parameters; that the one or more sets of HMM parameters include the set of purchase HMM parameters and the set of non-purchase HMM parameters; that the training encoder module is further configured to encode the clickstreams into sequences of webpage types; that the webpage types include a product-type webpage; that the training encoder module is further configured to parse subsequences from the encoded clickstreams; that the subsequences end in the product-type webpage; that the Hidden Markov Model training module is further configured to train the purchase HMM and the non-purchase HMM using a Baum-Welch Algorithm; that the classifier is further configured to classify the current clickstream by scoring the current clickstream to determine a likelihood that the current clickstream corresponds to an output of the one or more HMMs using a Forward Recursion Algorithm; that the classifier is further configured to classify the current clickstream by feeding at least one output of the Forward Recursion Algorithm into a Neural Network Classifier; an offer module is stored by the one or more memories and executable by the one or more processors to determine a customized offer to present to the current user based on the purchase probability and present the customized offer to the current user on a user device; that the customized offer includes an offer to sell the product using an incentive to the current user; that the customized offer is selected from a set of possible offers based on the purchase probability and one or more of a maximum expected revenue, a maximum expected profit, and a maximum number of expected sales that would result from a sale of the product at the discounted price; and an analysis module is stored by the one or more memories and executable by the one or more processors to compute an average precision score as a function of a number of hidden states used by the one or more HMMs, determine the number of hidden states corresponding to a highest value of the average precision score, and tune a hyperparameter used by the one or more Hidden Markov Models corresponding to the highest value of the average precision score.

In general, another innovative aspect of the subject matter described in this disclosure may be embodied in a method that includes receiving, using one or more computing devices, current session data describing a current session for a current user, extracting, using the one or more computing devices, a current clickstream from the current session data, classifying, using the one or more computing devices, the current clickstream as a purchase clickstream or a non-purchase clickstream by processing the current clickstream using one or more sets of Hidden Markov Model (HMM)

parameters produced by one or more HMMs, and computing, using the one or more computing devices, a purchase probability that the current user will purchase a product during the current session based on the classifying.

These and other implementations may each optionally include one or more of the following elements including receiving, using one or more computing devices, clickstreams for past users reflecting past online sessions of the past users; that the clickstreams including purchase clickstreams and non-purchase clickstreams; encoding, using the one or more computing devices, the clickstreams into encoded clickstreams; training, using the one or more computing devices, the purchase HMM and the non-purchase HMM based on the encoded clickstreams; that the purchase HMM produces a set of purchase HMM parameters and the non-purchase HMM produces a set of non-purchase HMM parameters; that the one or more sets of HMM parameters include the set of purchase HMM parameters and the set of non-purchase HMM parameters; that the HMMs include a purchase HMM and a non-purchase HMM; encoding the clickstreams into sequences of webpage types; that the webpage types include a product-type webpage; parsing subsequences from the encoded clickstreams; that the subsequences end in the product-type webpage; that training, using the one or more computing devices, the purchase HMM and the non-purchase HMM further includes training the purchase HMM and the non-purchase HMM using a Baum-Welch Algorithm; that classifying, using the one or more computing devices, the current clickstream includes scoring, using the one or more computing devices, the current clickstream to determine a likelihood that the current clickstream corresponds to an output of the one or more HMMs using a Forward Recursion Algorithm; that classifying, using the one or more computing devices, the current clickstream further comprises feeding, using the one or more computing devices, at least one output of the Forward Recursion Algorithm into a Neural Network Classifier, determining, using the one or more computing devices, a customized offer to present to the current user based on the purchase probability, and presenting, using the one or more computing devices, the customized offer to the current user on a user device; that the customized offer including an offer to sell the product using an incentive (e.g., a discounted price) to the current user; that the customized offer is selected from a set of possible offers based on the purchase probability and one or more of a maximum expected revenue, a maximum expected profit, and a maximum number of expected sales that would result from a sale of the product at the discounted price; computing, using the one or more computing devices, an average precision score as a function of a number of hidden states used by the one or more HMMs; determining, using the one or more computing devices, the number of hidden states corresponding to a highest value of the average precision score; tuning, using the one or more computing devices, a hyperparameter used by the one or more Hidden Markov Models corresponding to the highest value of the average precision score; and that classifying, using the one or more computing devices, the encoded current clickstream includes calculating, using the one or more computing devices, forward variables based on the set of purchase HMM parameters and the set of non-purchase HMM parameters using a Forward Recursion Algorithm and feeding the forward variables into a Neural Network Classifier.

Other innovative aspects include corresponding systems, methods, apparatus, and computer program products.

The disclosure is particularly advantageous over existing solutions in a number of respects. By way of example and not limitation, the technology described herein can use the history of one or more users to determine the probability that a particular user will perform a certain action in a current browsing section; can determine the probability that a particular user will perform an action before the user performs that action, whereas existing solutions often only measure a particular user's actions after the user has taken those actions; can determine the probability that a particular user will perform a certain action prior to the user taking that action and provide results based on that probability; and can determine the likelihood that a particular user will purchase a particular product and, in response, make the user a customized offer to increase the likelihood that the user will purchase the product.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the inventive subject matter.

BRIEF DESCRIPTION OF THE DRAWINGS

The specification is illustrated by way of example, and not by way of limitation in the figures of the accompanying drawings in which like reference numerals are used to refer to similar elements.

FIGS. 1A-1E illustrate an example embodiment for a 2-state Hidden Markov Model (HHM) including a state diagram, a transition matrix, emission distributions and a sample output.

FIG. 2 is a table illustrating an example embodiment of a symbol alphabet used to represent page visits in the clickstream path.

Figure 1A:
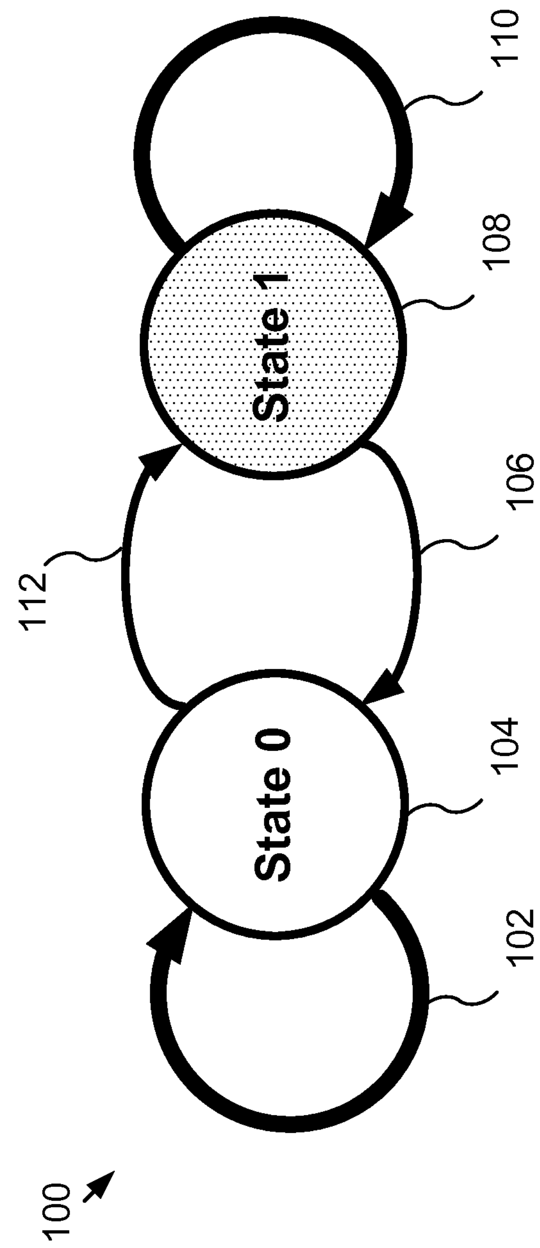

The figures depict various example embodiments for purposes of illustration and not limitation. Further, it should be understood from the following discussion that alternative embodiments of the structures and methods illustrated herein may be employed without departing from the principles described herein.

DETAILED DESCRIPTION

The present techniques now will be described more fully with reference to the accompanying drawings, which illustrate specific example embodiments by which the subject matter of this disclosure may be practiced. The subject matter described herein may, however, be embodied in many different forms and should not be construed as limited to the embodiments set forth herein; rather, these embodiments are provided by way of illustration to aid in understanding of the techniques. The subject matter may be embodied as methods or devices and may take the form of an entirely hardware embodiment or an embodiment combining software and hardware aspects. The following detailed description is, therefore, not to be taken in a limiting sense.

Definition of Terms

HMM (plural "HMMs")—Hidden Markov Model. HMMs refers to the general class of Hidden Markov Models, which are statistical models of sequences that have been used to model data in a variety of fields. Examples of fields include but are not limited to genomic modeling, financial modeling, and speech recognition. The sequences may be temporal, as in the example case of speech signals and financial time-series, or the sequences may have permanence, as in the example case of nucleotides along a genome.

A concrete example is given to aid in understanding the concept of HMMs, but this example should not be construed as limiting. A Hidden Markov Model may be used to model the Dow Jones Industrial Average (DJIA) on the stock market. It is believed that increases and decreases in the value of the DJIA are influenced by overall investor confidence in the market. Investor confidence, however, cannot be directly observed, and is thus considered a hidden factor in the model. Investor confidence may be considered to be in one of two hidden states, high (H) and low (L). The increases and decreases of the DJIA index on a daily basis are observable events and are considered to be the outputs of the hidden states. These outputs, sometimes also referred to as emissions, are considered to be the result of a stochastic (i.e., randomly determined) process. The stochastic outputs of the hidden states have an associated probability distribution. For example, one may consider that on a daily basis, the DJIA index will increase (I), stay the same (S), or decrease (D). For example, when the investors are in an H confidence state, the probability distribution for the DJIA daily change might be 60% I, 20% S, and 20% D. In contrast, when the investors are in an L confidence state, the probability distribution for the DJIA daily change might be 10% I, 20% S, and 70% D. The transitions between hidden states are also a stochastic process, and are governed by a transition probability matrix.

In the example given above, the emissions of the hidden states are a discrete set of events, in this case either D, S, or I, and the corresponding emissions distributions are probability mass functions. HMMs may also be constructed where the emissions are continuous. In the latter case, the emissions probability distributions would also be continuous, such as, for example, a Gaussian Distribution. One of the tasks involved in modeling with HMMs is to learn the initial state probabilities, emissions distributions, and transition probability matrix from a set of training data. In the example of the stock market HMM previously considered, this data would consist of the observed DJIA daily index values. In some embodiments of the present disclosure, these parameters can be learned from training data using the Baum-Welch algorithm.

URL—Uniform Resource Locator. Each unique page on a website has a URL.

c/s—refers to the encoded clickstream path.

c/ss—refers to more than one clickstream path.

ROC—response operating characteristic; a commonly-used performance characteristic of an automated classifier.

AUC—area under the ROC curve.

APS—average precision score, which is the area under the precision-recall curve.

Hyperparameter—a model parameter that is set by the designer of the system (not determined by the learning algorithm based on training data).

FIGS. 1A-1E illustrate an example embodiment for a 2-state HMM including a state diagram, a transition matrix, emission distributions and a sample output. FIG. 1A in particular is an illustration 100 of an example 2-state HMM, where the two states are represented as disks labeled State 0 (disk 104) and State 1 (disk 108). Transitions between states are indicated by arrows. The arrow 102 indicates a transition from State 0 to State 0, meaning the system remains at State 0. Please note that a system remaining in a given state is also referred to herein as transitioning to itself. The arrow 110 indicates a transition from State 1 to State 1. The arrow 106 indicates a transition from State 1 to State 0 and the arrow 112 indicates a transition from State 0 to State 1. Thicker arrows signify a higher probability of transition, thus as depicted in FIG. 1A, there is a higher probability that the system will remain at a present state than transition to a different state. For example, it is more likely that a system in State 0 will remain at State 0 than change to State 1. The probabilities that a system will transition from state to state may be depicted in a transition probability matrix.

In FIG. 1B, an example transition probability matrix 150 is shown as a table. The rows of the matrix refer to the initial state 152 and the columns refer to the final state 154. The number in each cell indicates the probability for a transition to occur from the state indicated by the cell row to the state indicated by the cell column. Thus, for example, the probability for a transition to occur from State 0 to State 1 is 0.2, and the probability for a transition to occur from State 0 to State 0 is 0.8. Similarly, as depicted, the probability for a transition to occur from State 1 to State 0 is 0.4, and the probability for a transition to occur from State 1 to State 1 is 0.6. Note that the rows of the matrix sum to one.

Figure 1C:
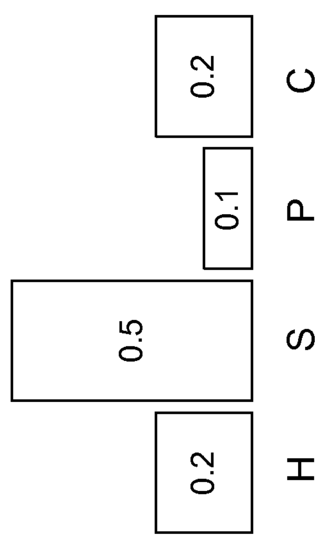

In FIG. 1C, an example emissions distribution 170 for hidden State 0 is shown. In this example, the HMM can emit a discrete alphabet 172 comprising symbols H, S, P, and C with a distribution of 0.2, 0.5, 0.1, and 0.2, respectively. More specifically, while in State 0, the HMM is 20% likely to emit the symbol H; 50% likely to emit the symbol S; 10% likely to emit the symbol P; and 20% likely to emit the symbol C.

Figure 1D:
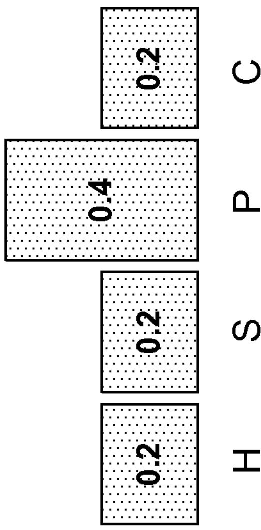

In contrast, In FIG. 1D, an example emissions distribution 180 for hidden State 1 is shown. In State 1, the HMM can emit the discrete alphabet 172 having a distribution of 0.2, 0.2, 0.4, and 0.2, respectively. In contrast to State 0 (see FIG. 1C), State 1 of the HMM is only 20% likely to emit the symbol H, 20% likely to emit the symbol S, 40% likely to emit the symbol P, and 20% likely to emit the symbol C, as indicated by the State 1 emission distribution 180.

Figure 1E:
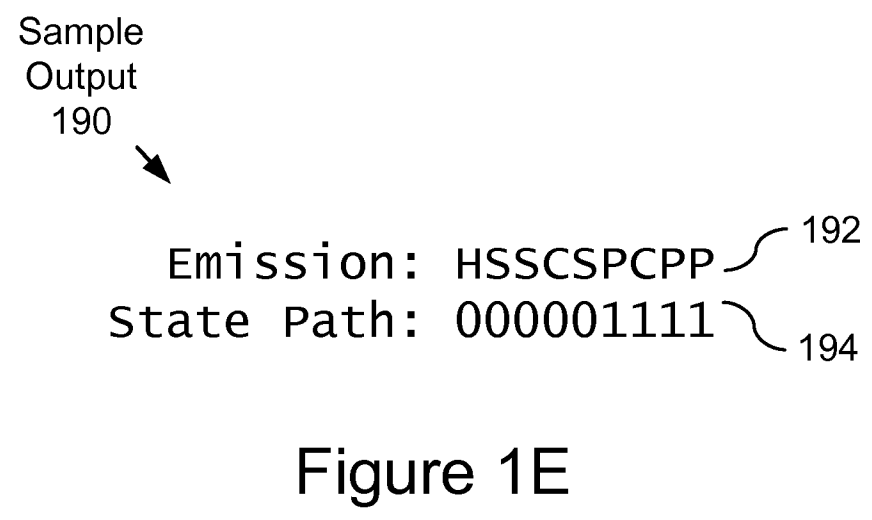

In FIG. 1E, a sample output 190 from this HMM is shown. More specifically, using the distributions illustrated in FIGS. 1C and 1D, the HMM may produce a sample output 190 including an observable component—the Emission Sequence 192 HSSCSPCPP. The hidden component—the hidden state sequence 194—that is the most probable explanation for this output is the State Path 000001111. In some embodiments, the most probable hidden state sequence can be computed using the Viterbi Algorithm, which is a dynamic programming algorithm for finding the most likely sequence of hidden states from an observable emission sequence, or another suitable algorithm.

The likelihood of any particular observed sequence under an HMM may be computed using the Forward Recursion algorithm (also called simply a Forward Algorithm), which is a recursive algorithm for calculating the probability of a certain observation sequence produced by the HMM, or another suitable algorithm. In another example, the Backward Recursion Algorithm can also be used to compute the likelihood of an observed sequence. Computing the likelihood of any particular sequence is also referred to as scoring. In an embodiment, the Forward Recursion algorithm takes as input the parameters of the HMM, which comprise the initial state probabilities, the transition probability matrix, and the emissions distributions.

An online user's clickstream information may be modeled using an HMM. Each page that the user visits may be considered as the observable output of an HMM and may be represented by a symbol. The number of individual pages in an e-commerce website may be quite large and treating each page as a distinct symbol of the HMM emission alphabet may not be feasible. A suitable form of encoding may be used to reduce the size of the emission alphabet. FIG. 2 is a table illustrating an example embodiment of a coding scheme for clickstream analysis. In this example, the resulting emission alphabet 202 has 12 symbols and the table includes a column showing an example emission alphabet 202, a list of webpages or actions 204 corresponding to each symbol in the emission alphabet 202, and set of descriptions 206 corresponding to each symbol in the emissions alphabet 202. In some implementations, the symbols represent types of webpages (webpage types) in a clickstream. For example, the symbol P may correspond to a product-type webpage, which may include product information, item description, price, availability, and product reviews.

Some concrete examples are given to aid in understanding the concept of clickstream encoding, but they should not be considered as limiting. During a particular user's session, the training encoder module 342 (discussed in detail in reference to FIG. 3B) may encode the user's clickstream path as HSSSP. Thus, the user started out on the website's home page (H). The user then made 3 searches, landing on 3 different search results pages (SSS). The user then selected (e.g., touched, clicked, etc.) on one of the listed products on the last search results page, which landed him or her on a product description page (P).

The training encoder module 342 may encode another user's session into the somewhat longer clickstream path HSSCSPCPP (e.g., the sequence of symbols may represent a set of webpage types), as shown in FIG. 1E. The HMM accounts for this clickstream path as follows. The user started in State 0 and made transitions back to State 0 for the next 4 page visits. For instance, the user remained in State 0 for 5 sequential page visits). While in State 0, the user visited different pages with probabilities given by the emission distribution for State 0 shown in FIG. 1C. After the fifth page, the user transitioned to State 1 and made transitions back to State 1 for the next 3 page visits. While in State 1, the user visited different pages with probabilities most closely corresponding to the distribution given by the State 1 emission distribution shown in FIG. 1D. In the above example, the hidden State Path 194 is the most probable explanation of the user's clickstream, given the particular configuration of the HMM, with its initial state probabilities, transition probability matrix, and emissions distributions. Other hidden State Paths are also possible explanations of the user's clickstream, albeit with lower probability of occurrence given the particular configuration of the HMM, with its initial state probabilities, transition probability matrix, and emissions distributions.

In some embodiments, the HMM training module 344 (described in detail in reference to FIG. 3B) learns the model parameters from historical data using a certain algorithm, such as the Baum-Welch algorithm, to model clickstream paths with HMMs. The Baum-Welch algorithm is an iterative algorithm that belongs to the general class of algorithms called Expectation-Maximization algorithms, which may be used to compute maximum likelihood model parameters in cases where the model involves latent variables and where a closed form solution is not possible. In the case of HMMs, the latent variables indicate which hidden state generated each emission. Each iteration consists of two steps, the Expectation or e-step and the Maximization or m-step. In the e-step, the latent variables are computed using the current values of the model parameters. In the m-step, the model parameters are updated with the values that maximize the likelihood of the data, given the latent variables. These two steps are iterated until the data likelihood stops changing appreciably.

Figure 3A:
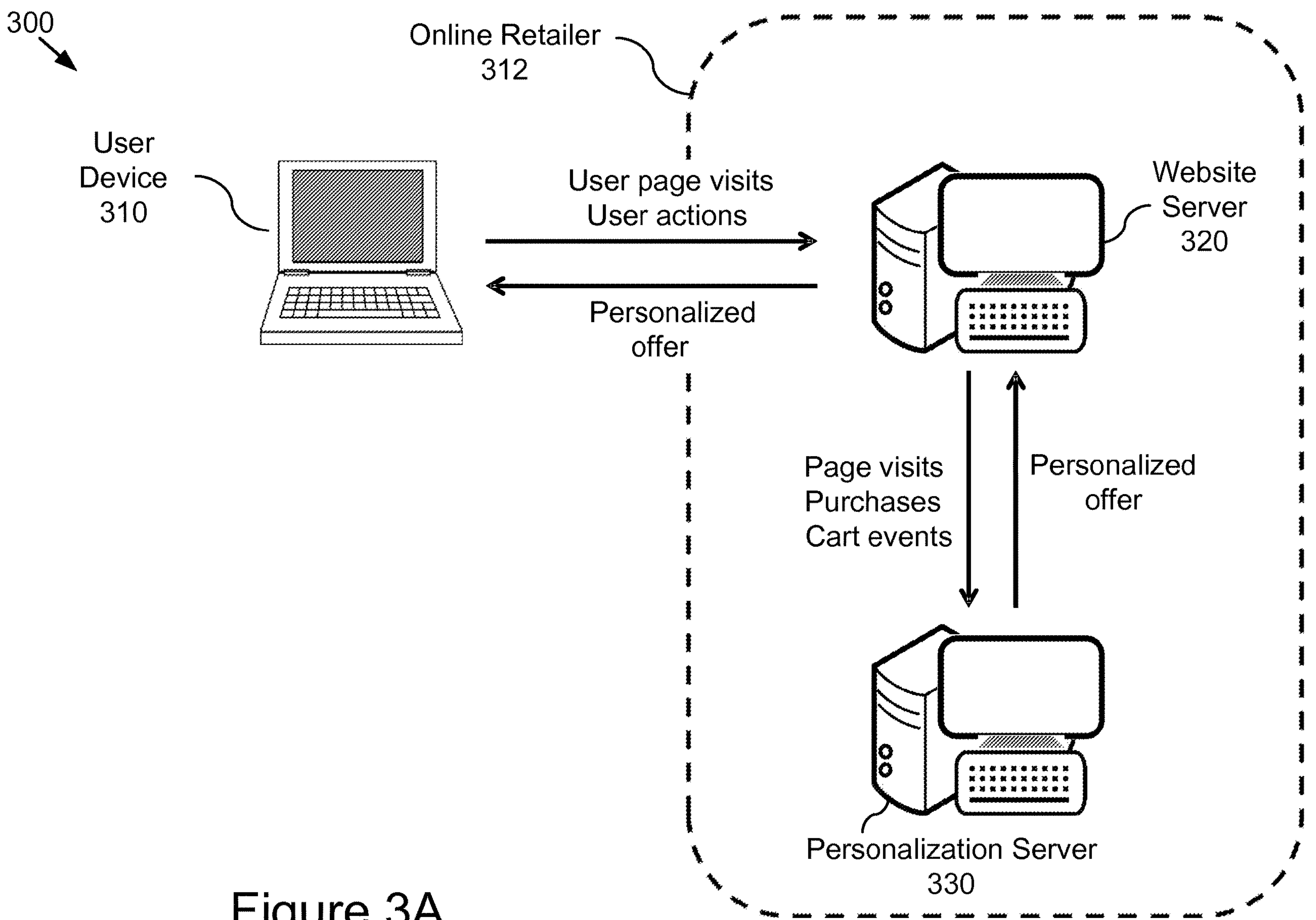
FIGS. 3A and 3B are block diagrams illustrating an example embodiment of a system employing HMMs to predict purchase behavior.

FIG. 3A illustrates one embodiment of a computing environment/system 300 in which the subject matter of the present disclosure may be practiced. An online retailer 312 may use the techniques taught in the present description to compute offers and present them to a user during his or her online session. A user device 310 is connected to the online retailer's 312 website server 320 via a network. The network may include any number of networks and/or network types. For example, the network may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, various combinations thereof, etc.

The user device 310 includes one or more computing devices having data processing and communication capabilities. In some embodiments, a user device 310 may include a processor (e.g., virtual, physical, etc.), a memory, a power source, a communication unit, and/or other software and/or hardware components, such as a display, graphics processor, wireless transceivers, keyboard, camera, sensors, firmware, operating systems, drivers, various physical connection interfaces (e.g., USB, HDMI, etc.). The user device 310 may couple to and communicate with the other entities of the environment 300 via the network using a wireless and/or wired connection. While a single user device 310 and website server 320 are depicted, it should be understood that the system 300 could include any number of these computing devices, as well as other computing devices such as third-party servers including data processing, storing and communication capabilities configured to provide one or more services including e-commerce; web analytics, internet searching; social networking; web-based email; blogging;

micro-blogging; photo management; video, music and multimedia hosting, distribution, and sharing; business services; news and media distribution; or any combination of the foregoing services. It should be understood that the third party server is not limited to providing the above-noted services and may include any other network-based or cloud-based service.

The user device 310 may include but is not limited to a computer, tablet, mobile device, etc. While a single user device 310 is depicted in FIG. 3A, the environment 300 may include any number of user devices 310. In addition, the user device(s) 310 may be the same or different types of computing devices.

In some embodiments, the user device 310 may include a user/client application (not shown). The user application may be storable in a memory (not shown) and executable by a processor (not shown) of a user device 310 to provide for user interaction, receive user input, present information to the user via a display (not shown), and send data to and receive data from the other entities of a computing system 300 via a computer network (e.g., the Internet, etc.). In some implementations, the user application may generate and present the user interfaces based at least in part on information received from the website server 320 via the network. For example, a customer/user may use the user application to receive the personalized shopping experience provided by the personalization server 330 and/or an e-commerce service provided by the website server 320, etc. In some implementations, the user application includes a web browser and/or code operable therein, a customized client-side application (e.g., a dedicated mobile app), a combination of both, etc.

The website server 320 may include one or more computing devices having data processing, storing, and communication capabilities. For example, the website server 320 may include one or more hardware servers, server arrays, storage devices and/or systems, etc. In some implementations, the website server 320 may include one or more virtual servers, which operate in a host server environment and access the physical hardware of the host server including, for example, a processor, memory, storage, network interfaces, etc., via an abstraction layer (e.g., a virtual machine manager). In some implementations, the website server 320 may include a web server (not shown), a REST (representational state transfer) service, or other server type, having structure and/or functionality for satisfying content requests and receiving content from one or more computing devices that are coupled to the network (e.g., the user device 310, etc.).

The user's page visits and actions, using the user device 310, on the website are communicated to the website server 320. These page visits and user actions are in turn communicated to a personalization server 330. The website server 320 informs the personalization server 330 about any changes to the user's cart as well as purchases made by the user. Using the techniques taught by the present subject matter, the personalization server 330 computes the probability that the user will make a purchase and uses this probability to decide if an offer should be made to the user. The personalization server 330 instructs the website server 320 to generate an offer and display it to the user.

Figure 3B:
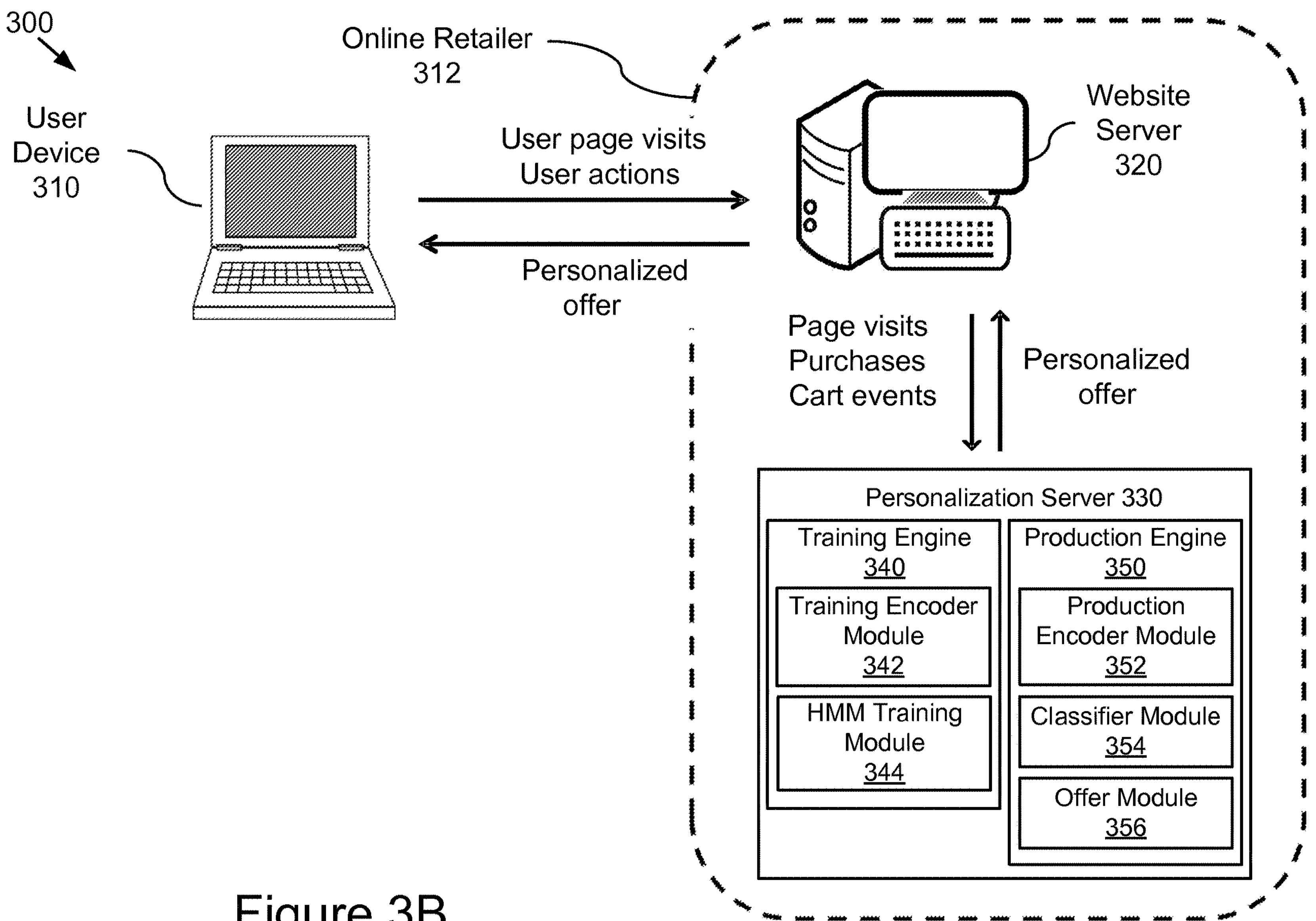

FIG. 3B illustrates in greater detail an example embodiment of the personalization server 330 described in reference to FIG. 3A. Although, FIG. 3B is generally directed to describing the personalization server 330, it should be understood that the website server 320 may include many of the same types of components (e.g., processor(s), memory (ies), communication unit(s), data store(s), etc.) as the personalization server 330, and that, in some embodiments, it may share components with the personalization server 330. For instance, in some embodiments, some or all of the structure and/or functionality of the personalization server 330 described herein could be included in/performed on the website server 320 and/or the structure and/or functionality could be shared between the website server 320 and the personalization server 330.

It should be understood that the system 300 illustrated in FIGS. 3A and 3B is representative of an example system, and that a variety of different system environments and configurations are contemplated and are within the scope of the present disclosure. For instance, in some further embodiments, various functionality may be moved between servers, from a server to a client, or vice versa, modules may be combined and/or segmented into further components, data may be consolidated into a single data store or further segmented into additional data stores, and some implementations may include additional or fewer computing devices, services, and/or networks, and may implement various functionality client or server-side. Further, various entities of the system 300 may be integrated into a single computing device or system or additional computing devices or systems, etc.

The personalization server 330 may include one or more hardware servers, server arrays, storage devices, and/or systems, etc. In some embodiments, the personalization server 330 may include one or more virtual servers which operate in a host server environment and access the physical hardware of the host server including, for example, a processor, a memory, a storage, network interfaces, etc. As depicted, the personalization server 330 includes a training engine 340 and a production engine 350.

The personalization server 330 may include one or more processors, memories, communication units, and data stores. Each of the components of the personalization server 330 may be communicatively coupled by a communication bus. The personalization server 330 is provided by way of example and it should be understood that it may take other forms and include additional or fewer components without departing from the scope of the present disclosure. For example, while not shown, the personalization server 330 may include input and output devices (e.g., keyboard, display, etc.), various operating systems, sensors, additional processors, and other physical configurations.

The processor(s) (not shown) may execute software instructions by performing various input/output, logical, and/or mathematical operations. The processor(s) may have various computing architectures to process data signals including, for example, a complex instruction set computer (CISC) architecture, a reduced instruction set computer (RISC) architecture, and/or an architecture implementing a combination of instruction sets. The processor(s) may be physical and/or virtual, and may include a single core or plurality of processing units and/or cores. In some implementations, the processor(s) may be capable of generating and providing electronic display signals to a display device (not shown), supporting the display of images, capturing and transmitting images, performing complex tasks including various types of feature extraction and sampling, etc. In some embodiments, the processor(s) may be coupled to the memory(ies) via a data/communication bus to access data and instructions therefrom and store data therein. The bus may couple the processor(s) to the other components of the personalization server 330, for example, memory(ies), communication unit(s), or a data store.

The memory(ies) (not shown) may store and provide access to data to the other components of the personalization server 330. For example, the memory(ies) may store components of the training engine 340 and the production engine 350. The memory(ies) is also capable of storing instructions and data, including, for example, an operating system, hardware drivers, software applications, databases, etc. The memory(ies) may be coupled to a data bus for communication with the processor(s) and other components of the personalization server 330.

The memory(ies) include one or more non-transitory computer-usable (e.g., readable, writeable, etc.) media, which can be any tangible non-transitory apparatus or device that can contain, store, communicate, propagate or transport instructions, data, computer programs, software, code, routines, etc., for processing by or in connection with the processor(s). In some embodiments, the memory(ies) may include one or more of volatile memory and non-volatile memory. For example, the memory(ies) may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blu-Ray™, etc.). It should be understood that the memory(ies) may be a single device or may include multiple types of devices and configurations.

The bus can include a communication bus for transferring data between components of a computing device or between computing devices, a network bus system including a network or portions thereof, a processor mesh, a combination thereof, etc. For example, the bus may enable communication between components of the online retailer 312 and/or other computing devices of the system 300, such as the user device 310. A software communication mechanism can include and/or facilitate, for example, inter-process communication, local function or procedure calls, remote procedure calls, etc. The personalization server 330, the training engine 340, and their components may be communicatively coupled, for example, via a data bus (not shown) to other components of the personalization server 330, the online retailer 312, and/or the user device 310.

A communication unit may include one or more interface devices (I/F) for wired and/or wireless connectivity with a network and the other components of the personalization server 330. For instance, a communication unit may include, but is not limited to, category (CAT)-type interfaces (e.g., wired connections, cable, Ethernet, etc.); wireless transceivers for sending and receiving signals using Wi-Fi™; Bluetooth®, cellular communications, etc.; USB interfaces; various combinations thereof; etc. A communication unit may be coupled to at least the other components of the personalization server 330 via a bus as described above.

The data store or data storage device may store information usable by the other components of the online retailer 312 including the personalization server 330 and may make the information available to the other components, for example, via a bus. In some embodiments, the data store may store historical data, user preference data, website data, current session data, pricing data, HMM-related data, other attribute data, and other information usable by the personalization server 330. The data store may include one or more mass storage devices. Information stored by a data store may be organized and queried using various criteria. Examples of query criteria may include any type of data stored by the data stores, such as any attribute in a customer profile, e-mail address, IP address, demographics data, user id, rewards account number, product identifier, price identifier, or any other information. A data store may include data tables, databases, or other organized collections of data. Multiple data stores may all be included in the same storage device or system, or disparate storage systems. In some embodiments, a data store may include a database management system (DBMS). For example, the DBMS could include a structured query language (SQL) DBMS, a not only SQL (NoSQL) DMBS, various combinations thereof, etc. In some instances, the DBMS may store data in multi-dimensional tables comprised of rows and columns, and manipulate, i.e., insert, query, update and/or delete, rows of data using programmatic operations. In some embodiments, a data store may be shared among and accessible to the components of the online retailer 312.

In the illustrated embodiment, the training engine 340 includes computer logic executable by a computer processor of the personalization server 330 to receive historical data from the website server 320 or other sources and to train HMMs for a given user or group of users. The training engine 340 is responsible for performing the operations of training HMMs, as depicted, for instance, in FIG. 5. The training engine 340 includes a training encoder module 342 and an HMM training module 344.

The training encoder module 342 includes computer logic executable by a computer processor of the personalization server 330 to receive historical data, including session data from one or more data sources. The historical data could be stored (e.g., on a memory or data store) on the personalization server 330, the website server 320, a third-party server, some other component of the online retailer 312, or could be stored on the user device 310 as web cookies or other files. The historical data may be linked to a particular user or group of users and may contain identifying information. The historical data includes analytics and/or session data such as a history of webpages visited by a given user, how much time the user spent on each webpage, ads that a user has clicked on or hovered over, and other information about the behavior of the user online. Historical data may reflect one or more past online sessions and/or the user's current session.

As discussed elsewhere herein, the historical data includes a clickstream (e.g., from a past online session), which may be in the form of a history of pages. The training encoder module 342 may encode a clickstream according to, for example, the method described in reference to FIG. 2. The training encoder module 342 may parse the clickstream from the historical data into shorter segments (also referred to herein as subsequences), or segments that are similar to a current clickstream of a user in a current session as described in reference to FIG. 7. In some embodiments, the training encoder module 342 may designate or separate the clickstreams into stream(s) in which a user purchased a product and stream(s) in which the user did not purchase a product. For example, a purchase clickstream includes a series of behaviors (e.g., clicks, page views, etc.) by a user where one of the actions/behaviors was that the user purchased a product (e.g., the product that was the subject of the last product page viewed by the user in a clickstream). In another example, a non-purchase clickstream includes a series of behaviors by a user where none of the actions/behaviors included purchasing a product.

Figure 5:
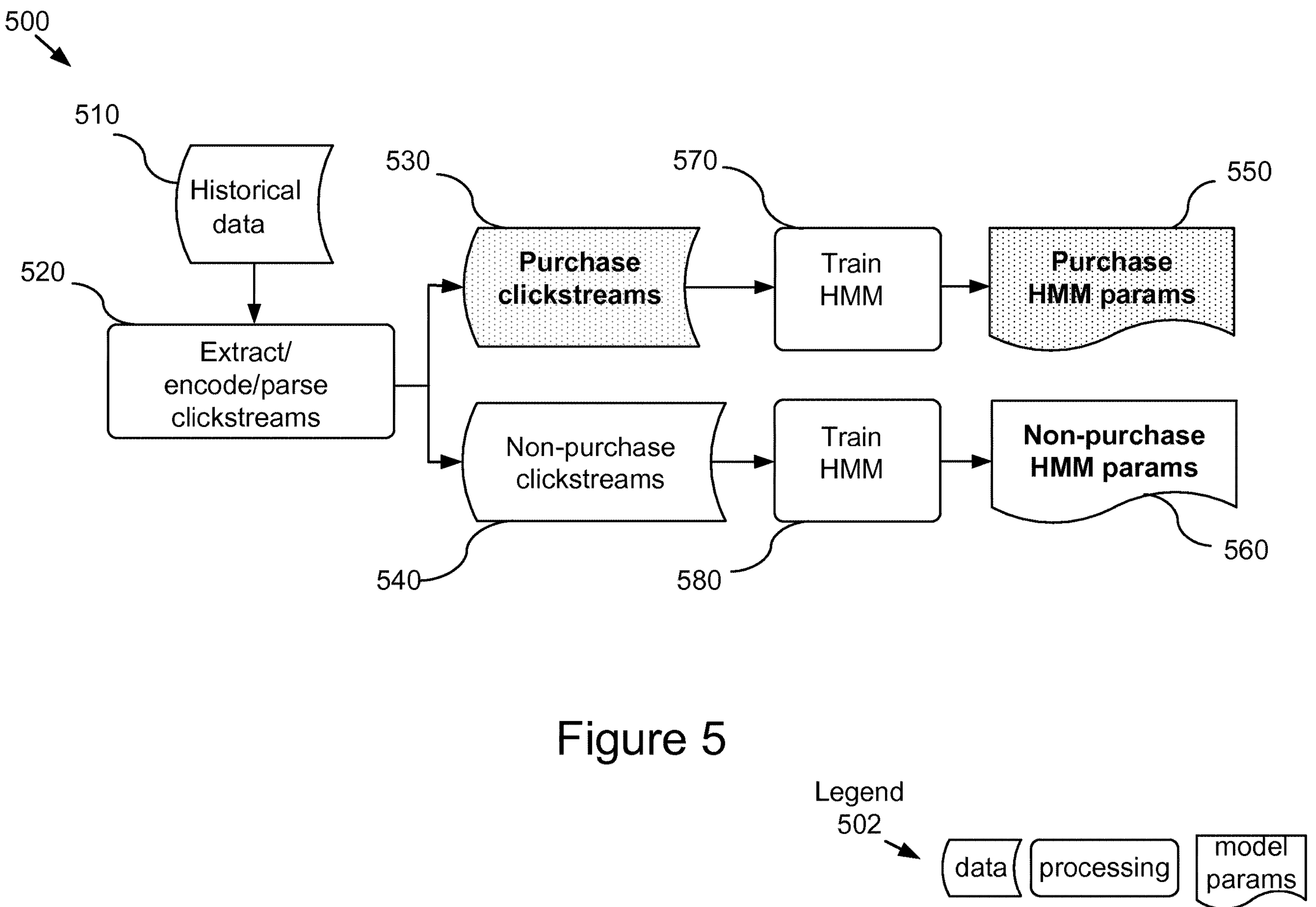
FIG. 5 is a block diagram illustrating a training phase of an example embodiment of a system employing HMMs to predict purchase behavior.

The HMM training module 344 includes computer logic executable by a processor of the personalization server 330 to receive clickstreams from the training encoder module 342. In some embodiments, the HMM training module 344 may receive the clickstreams in an encoded, parsed, and separated form. For example, the HMM training module 344 may receive, from the training encoder module 342, several clickstreams which have been encoded according to the example illustrated in FIG. 2, parsed, for example, by the training encoder module 342 to remove portions of the clickstreams after a user visited a product page, and separated by the training encoder module 342 into those in which a purchase was made and those in which a purchase was not made. The HMM training module 344 uses the clickstreams to train one or more HMMs. In some embodiments, the HMM training module 344 may use initial parameters supplied by a system administrator, taken from another user than the one who supplied the clickstream, or taken from a group of similar users to the user who supplied the clickstream. As described elsewhere herein, the HMM training module 344 may use the Baum-Welch algorithm to train the HMM in some embodiments. In some embodiments, the HMM training module 344 may continuously train one or more HMMs for a user or a group of users. In some embodiments, the HMM training module 344 may train or update the training of one or more HMMs for a particular user upon receiving a request from the user to view a product page. Additionally or alternatively, the HMM training module 344 may training may be precomputed. In an example, the HMM training module 344 may train or update the training of one or more HMMs for users at regular intervals in addition or alternative to training responsive to product page requests. For instance the HMM training module 344 may include and/or be triggered by a cron job or similar timer-based mechanism that is scheduled to execute at various regular intervals (e.g., every few seconds, minutely, hourly, daily, weekly, etc.). The HMM training module 344 outputs the parameters of the HMMs by storing them in a data storage device (not shown) for access by the other components of the personalization server 330 and/or sending the parameters to the classifier module 354. As illustrated in FIG. 5, the HMM training module 344 may provide a set of parameters (e.g., to the classifier module 354) for an HMM trained by clickstreams where the user made a purchase and a separate set of parameters for an HMM trained by clickstreams where the user did not make a purchase.

Figure 6:
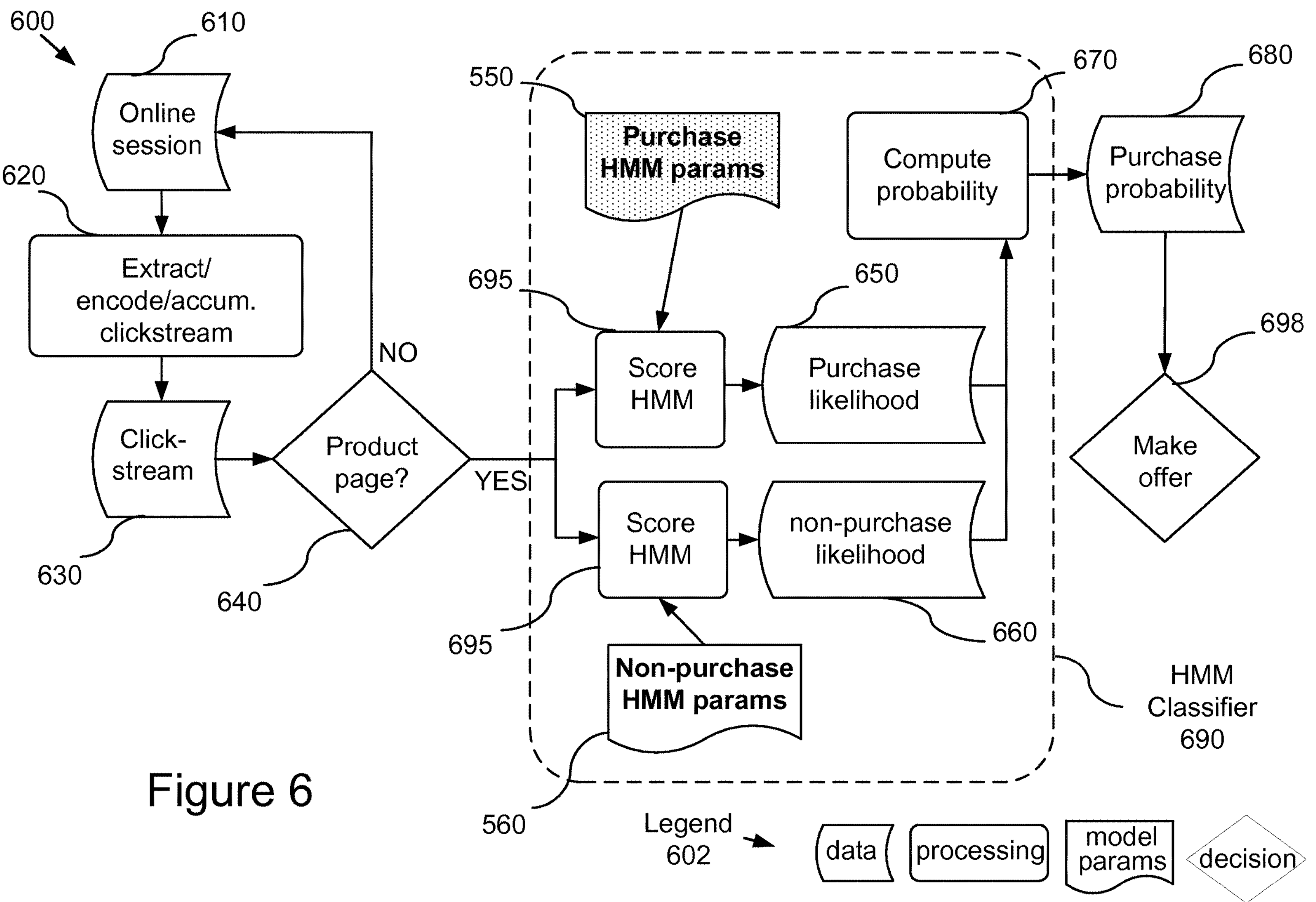
FIG. 6 is a block diagram illustrating a production phase of an example embodiment of a system employing HMMs to make an offer based on purchase probability.

In the illustrated embodiment, the production engine 350 includes computer logic executable by a processor of the personalization server 330 to receive current session data from the website server 320, uses the parameters from the training engine 340 to predict probabilities that a user will perform a given action, and in some embodiments, generates and suggests an offer to encourage a user to perform the given action. The production engine 350 is responsible for performing the operations of a production environment as depicted in FIG. 6. In the illustrated embodiment, the production engine 350 includes a production encoder module 352, a classifier module 354, and an offer module 356.

The production encoder module 352 includes computer logic executable by a processor of the personalization server 330 to encode historical data. The production encoder module 352 may receive historical data from the website server 320. Historical data may include current session data, such as a current clickstream tracking the behavior of a user during a browsing session. The current clickstream may include a series of pages visited by the user up to and including the current page the user is visiting, and, in some embodiments, may include other data from the current clickstreams, such as how long a user spends on a page, ads a user selects (e.g., clicks on, or hovers over, pauses on, touches via a touchscreen, etc.) and other behavior information.

For example, the production encoder module 352 may encode the clickstream according to the method disclosed in reference to FIGS. 2 and 7. The production encoder module 352 may send the clickstream to the classifier module 354 as soon as a user receives a request to view a product page, so the current clickstream automatically ends in a product-type webpage. Similarly, the production encoder module 352 may delay or forgo dividing the clickstream from the current session into a non-purchase and a purchase clickstream, because the user has not yet made a purchase during the current session. The production encoder module 352 is communicatively coupled to other entities forming the online retainer 312, such as the website server 320, a data store, and/or the classifier module 354. In some embodiments, the production encoder module 352 receives clickstream data from another information sources, such as the website server 320, an application interface (API), an application operating on the user device 310 (e.g., a tracking beacon configured to track user behavior on the user device 310), an analytics service accessible via the network, or another component. In some embodiments, the production encoder module 352 stores the encoded clickstream in a data store (e.g., a database, non-transitory memory, etc.) for access by the classifier module 354, provides the encoded clickstream directly to the classifier module 354, etc.

The classifier module 354 includes computer logic executable by a processor of the personalization server 330 to classify a current clickstream using one or more HMMs. The classifier module 354 performs the acts and/or functions of the HMM classifier 690 of FIG. 6 and, in some embodiments, the neural network classifier 1070 of FIG. 10. As described at least in reference to FIG. 6, the classifier module 354 scores (e.g., using the Forward Recursion algorithm) the current clickstream using the HMM parameters received from the training engine 340 to determine likelihoods that the current clickstream (e.g., encoded in the form of a sequence of symbols as in FIGS. 7A and 7B) corresponds to an output of the HMM. For example, the classifier module 354 may classify a current clickstream using several different HMMs corresponding to various offers as described in reference to FIG. 11.

The classifier module 354 may be communicatively coupled to other elements of the online retainer 312, such as the training engine 340, the production encoder module 352, a data store, etc. For example, the classifier module 354 may receive parameters from the training engine 340 and a current clickstream from the production encoder module 352, or may retrieve this data from a data store as stored by these components. In another example, the classifier module 354 may write probability data including probabilities computed by it to a data store for access by other components of the personalization server 330 or may communicate the probability data to these components, such as the offer module 356.

Figure 10:
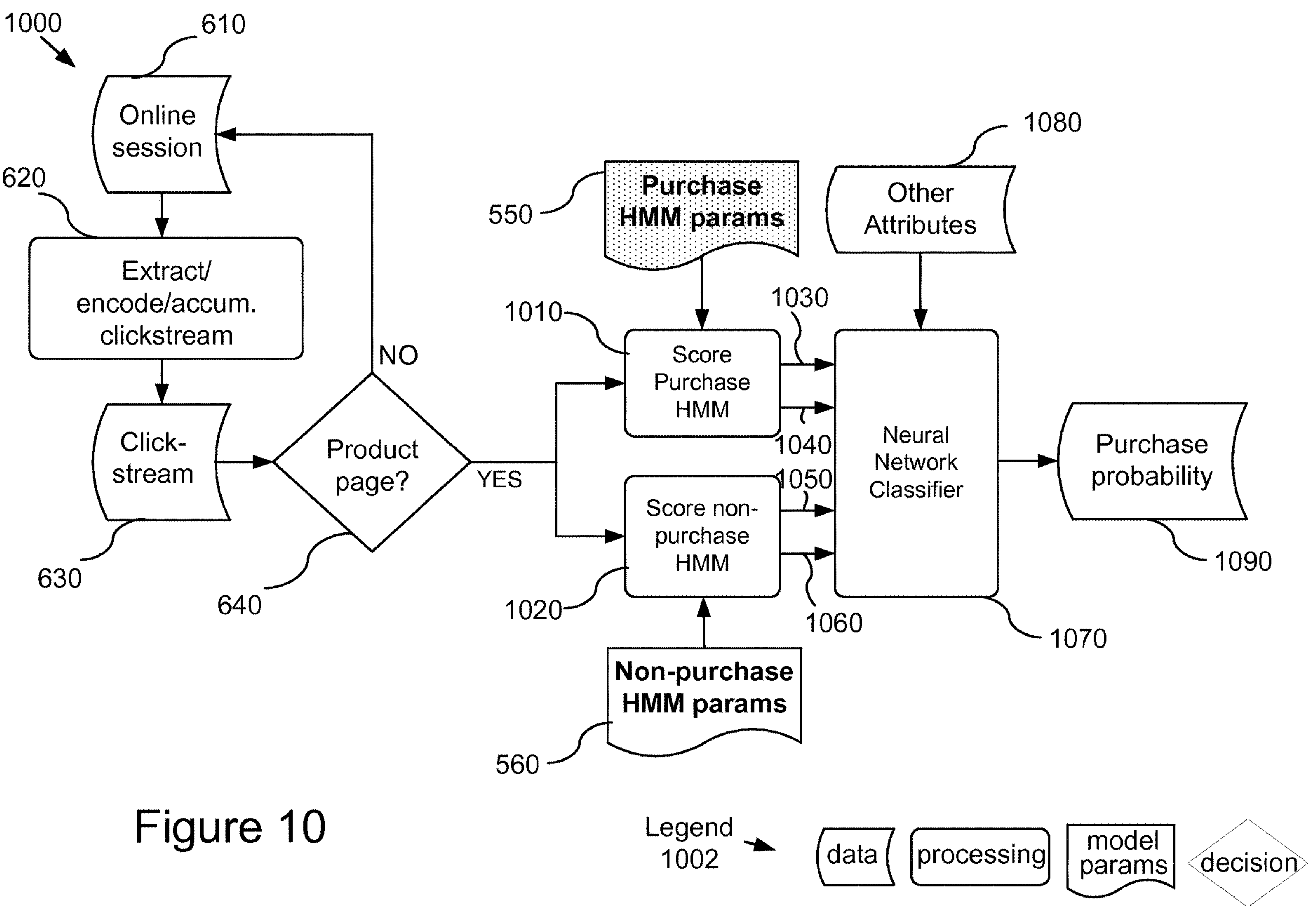
FIG. 10 illustrates an example embodiment of using HMM forward variables as input to a classifier.

In some embodiments, the classifier module 354 may use a neural network classifier 1070 as described in reference to FIG. 10. The classifier module 354 may calculate forward variables, input the forward variables and other attributes to an artificial neural network, and use the neural network to calculate probabilities.

The offer module 356 is coupled to and may include computer logic executable by a processor of the personalization server 330 to formulate offers (e.g., a discount or other offer to send to the user device 310) based on probability data. The probability data may include a predicted probability that a user will perform some action during a current session. In some embodiments, the offer module 356 may determine a customized offer for a given user based on the probability that that user will purchase the product on the requested product page, as reflected by probability data calculated by the classifier module 354. The classifier module 345 may provide the probability data as output to the offer module 346 as discussed further herein with reference to at least FIG. 11.

The probability data may include various probabilities for multiple different offers. The offer module 356 may evaluate these probabilities based on a particular business objective. The business objective may reflect whether to optimize profit or revenue via the offer being made, and the offer module 356 may evaluate the probabilities of the different offers to determine which one would maximize the objective. In some implementations, the offer module 356 may present a customized offer to a current user on a user device 310 and the customized offer may include an offer to sell a product using an incentive (e.g., for a discounted price) to the current user based on the probabilities. For example, the classifier module 356 may use the probabilities included in the probability data to determine an offer that optimizes profit or revenue. Further detail and examples are discussed with reference to at least FIG. 12. The offer module 356 may be coupled to and send the offer to the website server 320, which may, in turn, generate and send the product page with the offer to the user device 310 for display to the given user.

In some embodiments, the personalization server 330 may include various other engines and modules than those illustrated in FIG. 3B. For example, the personalization server 330 may include an analysis module (not shown). The analysis module may measure the performance of the system, adjust the hyperparameters of the system in response to performance metrics, provide statistics to a system administrator, and conduct experiments to measure the performance of the system, etc. The analysis module may be coupled to and receive data from the classifier module 354, the offer module 356, the website server 320, or other components (e.g., a data store) of the system not illustrated in the figures. The analysis module performs operations described in reference to FIG. 8 and FIG. 10.

Figure 4:
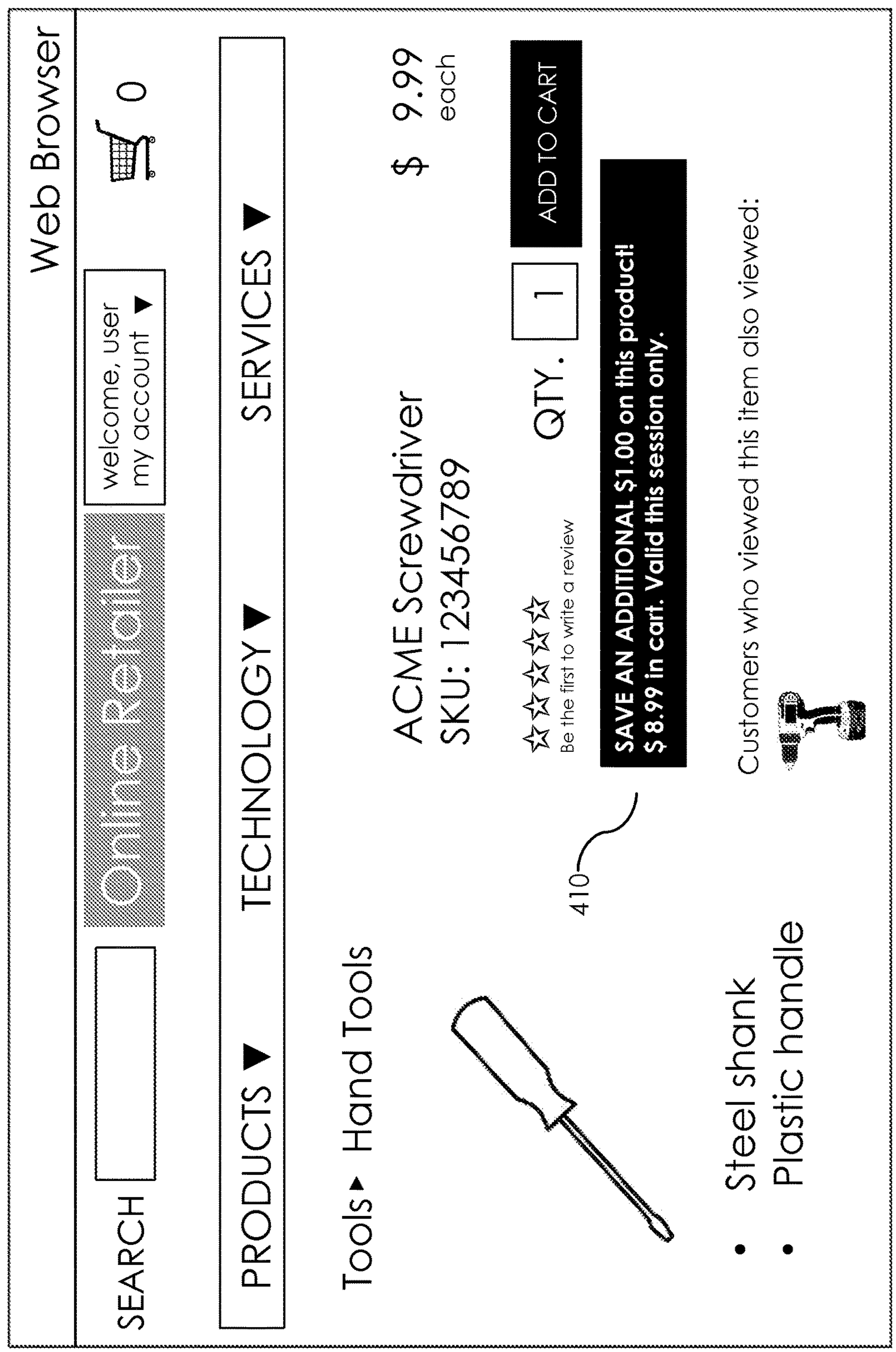
FIG. 4 is a graphical representation of an example user interface with a personalized offer made to an online user of a retail website.

FIG. 4 illustrates an embodiment of an example interface 400 including a product page associated with an online retailer's 312 website. The interface 400 includes various interactive navigational elements, input fields, and buttons, as well as a personalized offer 410 for a product (e.g., screwdriver). The personalized offer 410, generated with the techniques taught in the present disclosure, may be presented to the user via the interface 400 by the user device 310, and responsive thereto, the user may choose to accept the offer and add the subject product to his or her cart by selecting the button "ADD TO CART".

FIG. 5 is a block diagram illustrating an embodiment of an example training process 500 for the HMMs that are used to predict purchase behavior. The block diagram includes a legend 502 indicating the meanings of the differently shaped boxes in the figure. The website server 320 collects (e.g., aggregates in a data store) historical data 510 describing a history of behavior reflected by actions taken by the user in interacting with various graphical user interfaces. In some embodiments, the historical data may include session data pertaining to a multiplicity of users over a period of time. The session data includes a record of each page (URL) that a given user visited in his or her session. The training encoder module 342 receives the session data, and in block 520, extracts the clickstream path, encodes it, and parses it according to a coding scheme, such as the embodiment shown in FIGS. 2 and 7. For example, in some implementations, the training encoder module 342 may extract a purchase clickstream from a past online session during which a user made a purchase or may extract a non-purchase clickstream from a past online session in which a user did not make a purchase.

The session data also includes a binary variable indicating if the user made a purchase or not. Accordingly, this binary purchase variable may be used by the training engine 340 (e.g., the training encoder module 342 or the HMM training module 344) to divide the clickstream paths into those from sessions that resulted in a purchase being made 530 and those that did not result in a purchase being made 540. The purchase clickstreams 530 are used to train 570 an HMM that models purchase clickstreams (e.g., a purchase HMM). The purchase HMM parameters 550 (also referred to herein simply as purchase parameters) may also be stored, for example, in the data store for access by the production engine 350. The non-purchase clickstreams 540 are used to train 580 an HMM (e.g., a non-purchase HMM) that models non-purchase clickstreams. The non-purchase HMM parameters 560 (also referred to herein simply as purchase parameters) may also be stored, for example, in the data store for access by the production engine 350. In some embodiments, the trainings 570 and 580 are carried out by the HMM training module 344 using the Baum-Welch Algorithm. The HMM parameters 550 and 560 are used to construct an HMM classifier that may be used to predict the purchase behavior for online user sessions, as described at least in reference to FIG. 6.

As discussed further elsewhere herein, an HMM is a statistical model of sequence of events. An example of a sequence of events would be a browsing session where a user browses different webpages. The HMM provides a statistical model of the sequence of events, such as the browsing behavior. The HMM computes variables that are functions of the events that occur, such as the pages that are visited. In some embodiments, the HHM computes the variables and outputs them to a classifier (e.g., neural network, decision tree, etc.). These variables from the HMM advantageously enhance the classification capability for classifying whether a certain outcome will occur, such as whether a person is going to purchase a particular product or not.

An example of variables that are computed by the HMM and processed by the classifier are forward variables. A forward variable is computed for each event that occurs. For example, a forward variable is computed for a first page visit, and then for every page visit subsequent to that during a browsing session of a particular user. At the end of the session, or when the user lands on a particular page type, the forward variable for the last event that occurred is the one that may be used by the classifier. For instance, the forward variable computed for the last page visit for the user may be used by the classifier to determine the outcome. An HMM outputs a forward variable to the classifier for each of its states (e.g., 3 states, 3 forward variables). Additional description of the forward variables and the classifier are further discussed elsewhere herein.

FIG. 6 is a block diagram illustrating an embodiment of an example production process/environment 600 that uses an HMM clickstream classifier 690.

With reference to FIG. 6 in particular, the block diagram includes a legend 602 indicating the meaning of the shapes of the boxes in the figure. The website server 320 receives and/or generates 610 online session data tracking a user's online behavior (e.g., current online session data describing a current session). The production encoder module 352 extracts and encodes 620 the current user's page visits and accumulates 630 a clickstream path. In an embodiment, the website server 320 may make an offer to a user when the user lands on a product description page and the decision whether to make an offer depends on the probability that the user will make a purchase (e.g., based on the past online session data). When the user lands on a product description page, the encoded clickstream path 630 will end in the P symbol. In some embodiments, the website server 320 may include an offer in a product description page that is presented to the user because the probability that the user will make a purchase meets a certain probability threshold. If the user has not landed on a product description page, control is passed back to the user via block 640 until he or she does land on a product description page.

Once the user is on a product description page, the accumulated clickstream path 630 is processed by the classifier module 354 to compute the purchase probability. This may proceed as follows. The likelihood 650 of the clickstream path 630 is computed under the purchase HMM parameters 550. In addition, the likelihood 660 of the clickstream path 630 is computed under the non-purchase HMM parameters 560. Both of the computations are carried out using the HMM scoring algorithm 695 also known as the Forward Recursion. From these two likelihoods, the purchase probability 680 may be computed using a simple formula.

$$P_{purchase} = \frac{L_{purchase}}{L_{non\text{-}purchase} + L_{purchase}} \qquad \text{Equation 1}$$

Here $L_{purchase}$ is the purchase HMM likelihood 650, $L_{non\text{-}purchase}$ is the non-purchase HMM likelihood 660, and $P_{purchase}$ is the purchase probability 680 from FIG. 6. The computation in Equation 1 is carried out in block 670 in FIG. 6.

In some embodiments, the likelihoods 650 and 660 are carried out logarithmically and thus are log-likelihoods. For these embodiments, computation 670 uses the following simple formula.

$$P_{purchase} = \frac{\exp(L_{purchase})}{\exp(L_{non\text{-}purchase}) + \exp(L_{purchase})} \qquad \text{Equation 2}$$

Here, exp is the exponential function, $L_{purchase}$ is the purchase HMM log-likelihood 650, and $L_{non\text{-}purchase}$ is the non-purchase HMM log-likelihood 660. The computation in Equation 2 can lead to overflow. In some embodiments of the subject matter, the computation 670 of FIG. 6 uses the following formula, which is immune to numerical issues, including overflow.

$$P_{purchase} = \begin{cases} \dfrac{1}{\exp(L_{non\text{-}purchase} - L_{purchase}) + 1} & \text{for } L_{purchase} \geq L_{non\text{-}purchase} \\ \dfrac{\exp(L_{purchase} - L_{non\text{-}purchase})}{1 + \exp(L_{purchase} - L_{non\text{-}purchase})} & \text{for } L_{purchase} < L_{non\text{-}purchase} \end{cases} \qquad \text{Equation 3}$$

The assemblage of components in the dashed block 690 of FIG. 6 is referred to as an HMM Classifier.

In the production environment shown in FIG. 6, clickstreams 630 that are processed by the HMM clickstream classifier 690 end with a product page.

Referring back to the training environment shown in FIG. 5, the clickstreams 530 and 540 that are extracted from historical data and used to train the HMM clickstream classifier may be parsed to emulate the production environment.

Figure 7A:
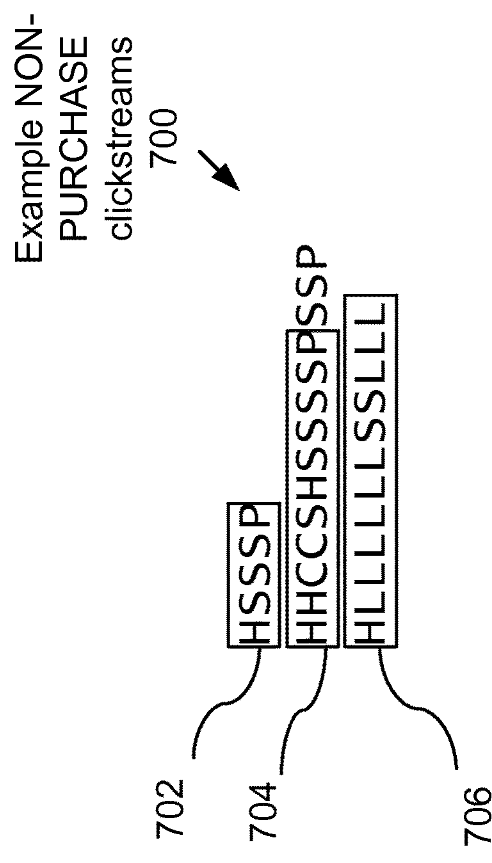
FIGS. 7A and 7B illustrate examples of clickstream parsing which prepares data for input into the purchase prediction HMMs.
Figure 7B:
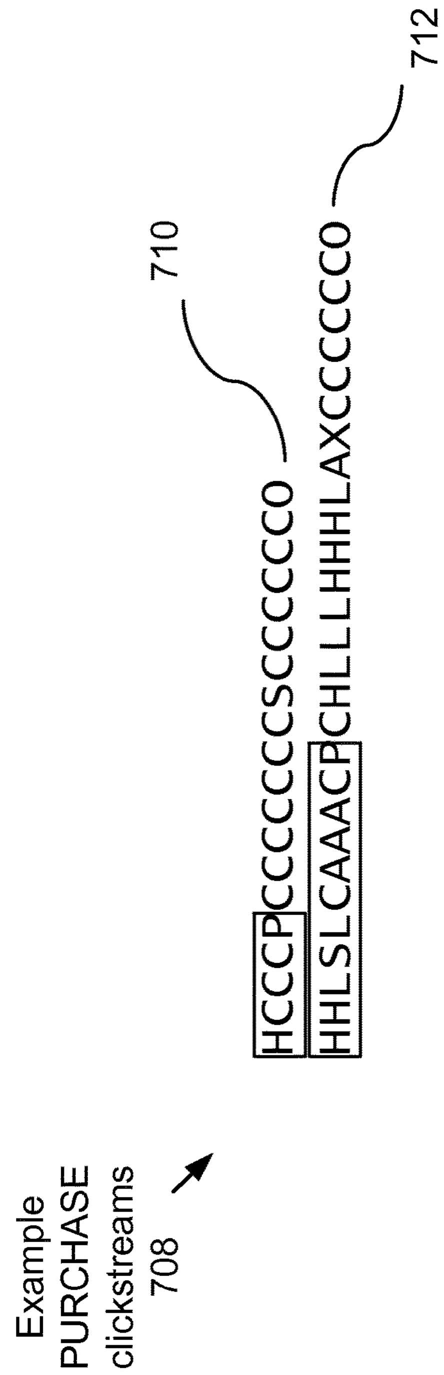

FIG. 7 illustrates an embodiment of an example parsing algorithm applied (e.g., by the training encoder module 342 or the production encoder module 352) to both purchase 700 and non-purchase clickstreams 708 to carry out this production environment emulation. The parsing algorithm uses the portion of the user's clickstream up to and including the first product information page encountered. In FIG. 7A, the first two clickstreams 702 and 704 contain P; the box indicates the portion of the clickstream path that is used for training the non-purchase HMM classifier 690. The third clickstream 706 in FIG. 7A does not encounter a product information page, so the entire clickstream is used for training. In FIG. 7B, the portions of the clickstream paths 710 and 712 up to and including the first P are included in training the purchase HMM classifier 690.

Figures 8A, 8B:
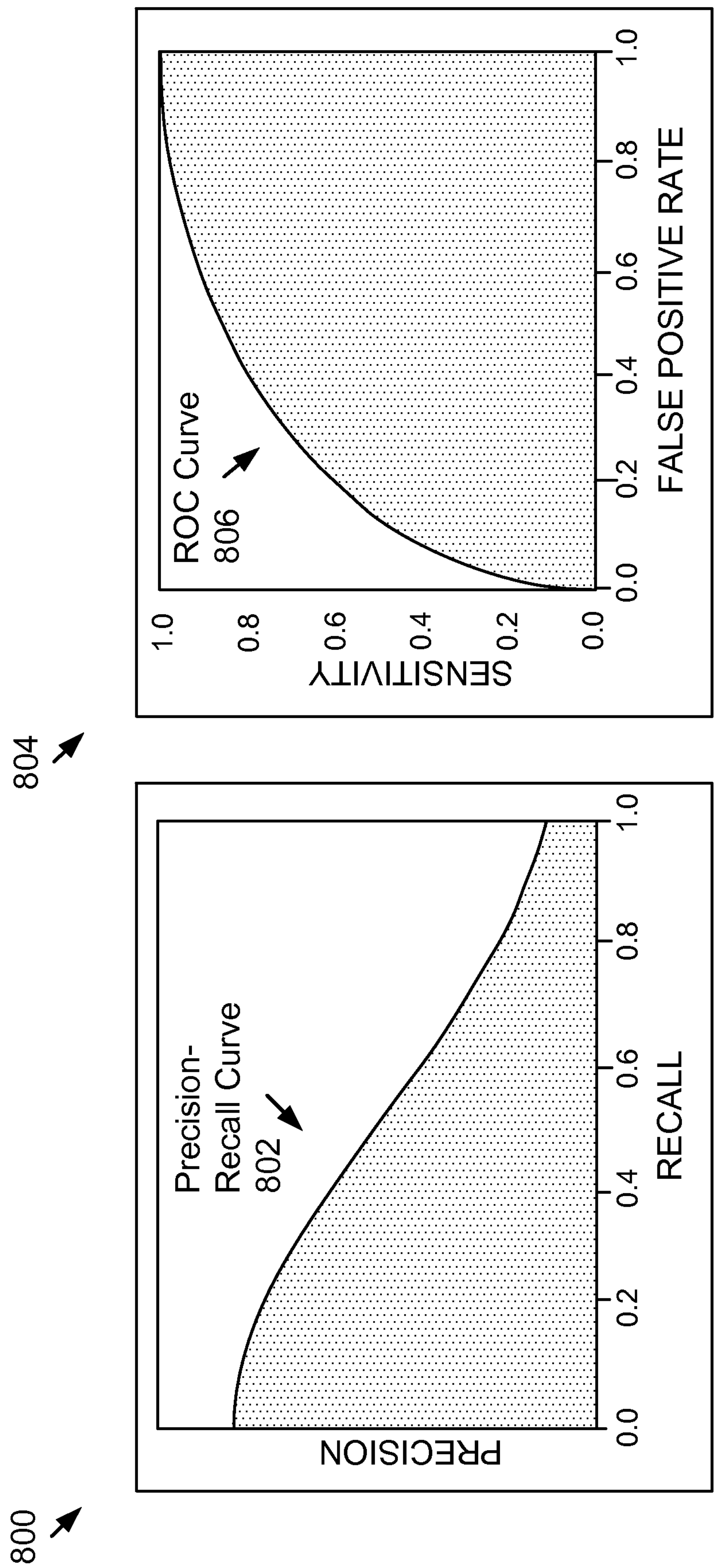
FIGS. 8A and 8B illustrate example performance metrics obtained when an example embodiment of purchase prediction HMMs is applied to validation data.

When the HMM clickstream classifier 690 is put into practice, experiments may be conducted to measure the performance of the system. Some of the historical data may be used for training and some of the historical data may be used as validation data. In different embodiments, different portions of the historical data may be allocated to training and validation. The validation data may be used to compute performance metrics. FIG. 8 shows plots of examples of two commonly-used characteristics of automated classifiers. In FIG. 8A, the precision (also known as the positive predictive value) of the classifier is plotted against the recall (also known as the sensitivity or true positive rate) in the graph 800. This generates a precision-recall curve 802 that is well-known to practitioners of the art of pattern recognition. The higher the precision-recall curve, the better the performance of the model. The area under the precision-recall curve is commonly used as a performance metric; this is shown as the shaded area in FIG. 8A. This area is often abbreviated as APS, which stands for average precision score. Another commonly-used characteristic is the ROC curve 806 of the classifier and an example is shown in the graph 804 in FIG. 8B. ROC is a term coming from radar technology, and stands for response operating characteristic. The ROC curve plots the sensitivity of the classifier versus the false positive rate. Recall and sensitivity are two names for the same performance characteristic. Again, the higher the ROC curve, the better the model. The area under the ROC curve is also commonly used as a performance metric, and goes by the abbreviation AUC, which stands for area under the (ROC) curve.

Figure 9:
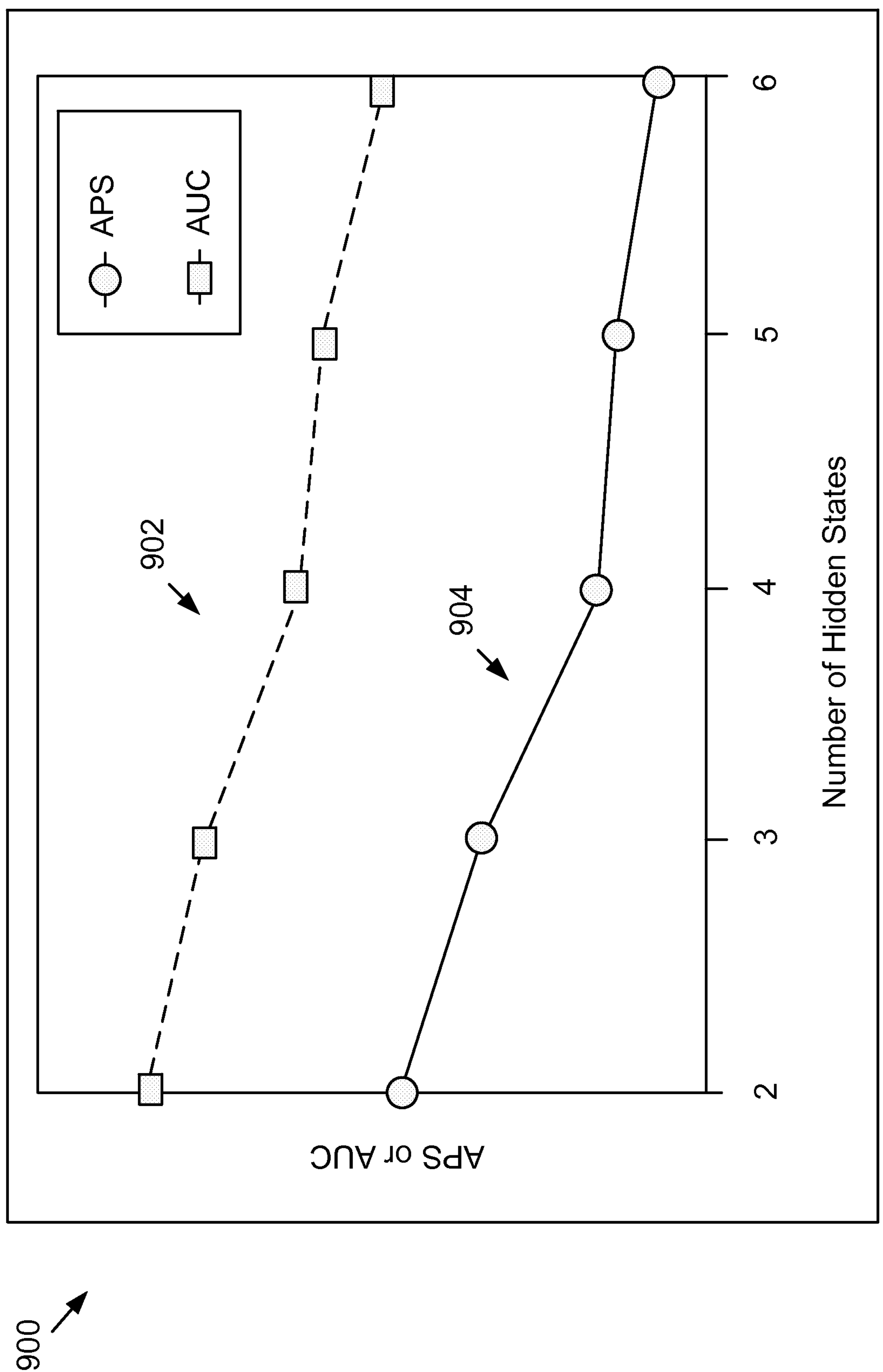
FIG. 9 illustrates a variation in performance metrics when a plurality of example embodiments of purchase prediction HMMs with differing number of hidden states are applied to validation data.

In some implementations, the analysis module (not shown) may compute an APS as a function of a number of hidden states used by the HMMs, and determine the number of hidden states corresponding to a highest value of the APS. For example, the analysis module may determine a plurality of APS values, each of the APS values corresponding to a certain number of hidden states as well as corresponding to an area under a precision-recall curve, determine which of the plurality of APS values is greatest among the plurality of APS values, determine the certain number of hidden states corresponding to the APS value that is greatest, and set the number of hidden states used by the HMMs (e.g., the purchase HMM and non-purchase HMM) to the certain number of hidden states corresponding to the APS value that is the greatest. In other embodiments, the AUC as a function of the number of hidden states is used to determine an optimal number of hidden states. An example plot 900 of APS 904 and AUC 902 versus the number of hidden states is shown in FIG. 9.

By way of recapitulation, The HMM classifier 690 shown in FIG. 6 computes the purchase probability 680 for a user based on his or her clickstream path. This probability derives from the purchase likelihood 650 and the non-purchase likelihood 660. These are computed by the scoring algorithm 695, also known as the Forward recursion. The naming of the Forward recursion stems from its computation of the forward probability of ending up in a particular hidden state based on the state probabilities in the previous step of the clickstream. The forward recursion starts at the beginning of the clickstream and ends at the last symbol in the clickstream. The final value of the forward variable for a state is equal to the probability of ending up in that state at the end of the clickstream. There is one forward variable for each hidden state.

The values of the forward variables for each hidden state and for each of the purchase and non-purchase HMMs encode information that may be predictive of the user's purchase behavior. These variables may be used as additional input to a traditional purchase behavior classifier, for example a neural network.

A block diagram of a representative embodiment of an example arrangement 1000 using a neural network classifier 1070 is shown in FIG. 10. The block diagram includes a legend 1002 indicating the meaning of the shapes of the boxes in the figure. The purchase and non-purchase HMM parameters 550, 560 are learned (e.g., by the training engine 340) from historical data as in FIG. 5. These parameters are input to the HMM scoring algorithm, or Forward recursion, in blocks 1010 and 1020 respectively. The outputs of the purchase HMM scoring block 1010 are the forward variables at the last the clickstream step (e.g., a purchase-type webpage). These are shown as outputs 1030, 1040 (in the case of 2 hidden states) and they are fed to a neural network classifier 1070. The forward variable outputs 1050, 1060 of the non-purchase HMM scoring block 1020 are also fed to the neural network classifier 1070. Other attributes (e.g., user type (e.g., consumer or business), demographic information, product information, etc.) 1080, from other sources, may also be used as input to the neural network classifier 1070. Based on all of its inputs, the neural network classifier 1070 outputs a purchase probability 1090. This computed probability is informed by both clickstream and non-clickstream data. In other embodiments, the neural network classifier 1070 may be replaced by other types of classifiers. A non-exhaustive set of classifiers that may be substituted includes support vector machines, decision trees, logistic regression, naïve Bayes, ensemble classifiers, and linear discriminant analysis classifiers.

In some embodiments, the clickstream HMM classifier 690 may be employed to compute the purchase probability for a plurality of different offers. To aid in understanding, a concrete example will be given, but this example should not be construed as limiting the scope of this disclosure. Furthermore, the example presented should not be considered as exhaustive. The designer may have three different offers, A, B, and C that may be presented to an online user. The designer may wish to maximize, for example, the expected revenue (e.g., probability to purchase multiplied by the price), the expected profit (e.g., probability to purchase multiplied by the margin), or the maximum number of expected sales (e.g., the total number of sales of one or more products) from the retail website. Each of the offers has an associated revenue value that is known in advance. The designer may use the clickstream HMM classifier 690 to decide which of the three offers A, B, or C to present to the user to maximize the expected total revenue.

Figure 11:
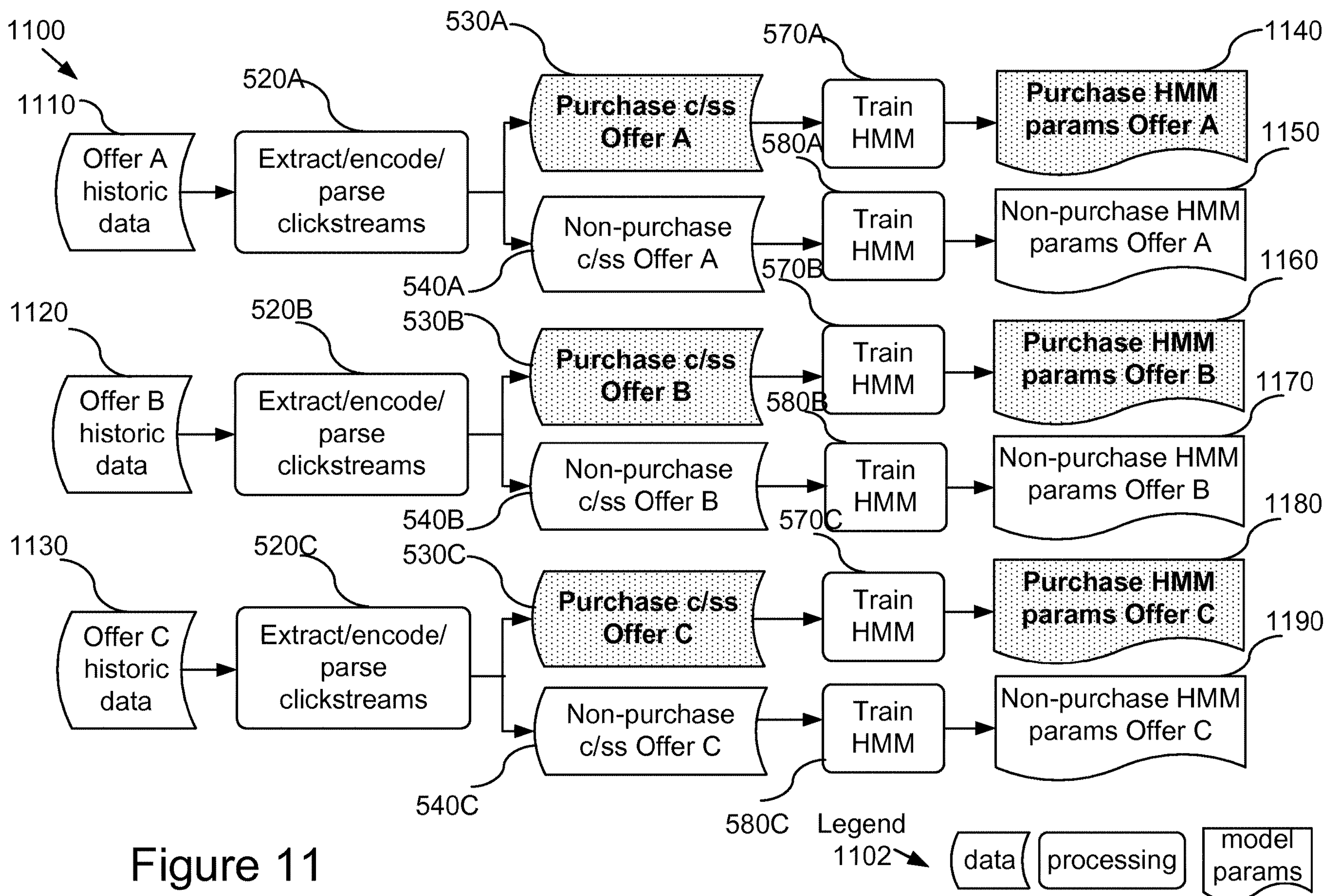
FIG. 11 is a block diagram illustrating a training phase of an example embodiment of a system employing HMMs to predict purchase behavior based on different offers.

FIG. 11 is a block diagram illustrating an embodiment of an example training environment 1100 or process that may be used to maximize the expected revenue or the expected profit based on different offers. The block diagram includes a legend 1102 indicating the meaning of the shapes of the boxes in the figure. Historical data for all three offers (e.g., a set of incentives), A, B, and C is available and shown as blocks 1110, 1120, and 1130, respectively, in FIG. 11. The training process shown in FIG. 5 is replicated for each of the three offers, A, B, and C. Purchase and non-purchase HMM parameters are computed and saved for offers A, B, and C, as shown in blocks 1140, 1150, 1160, 1170, 1180, and 1190 in FIG. 11.

Figure 12:
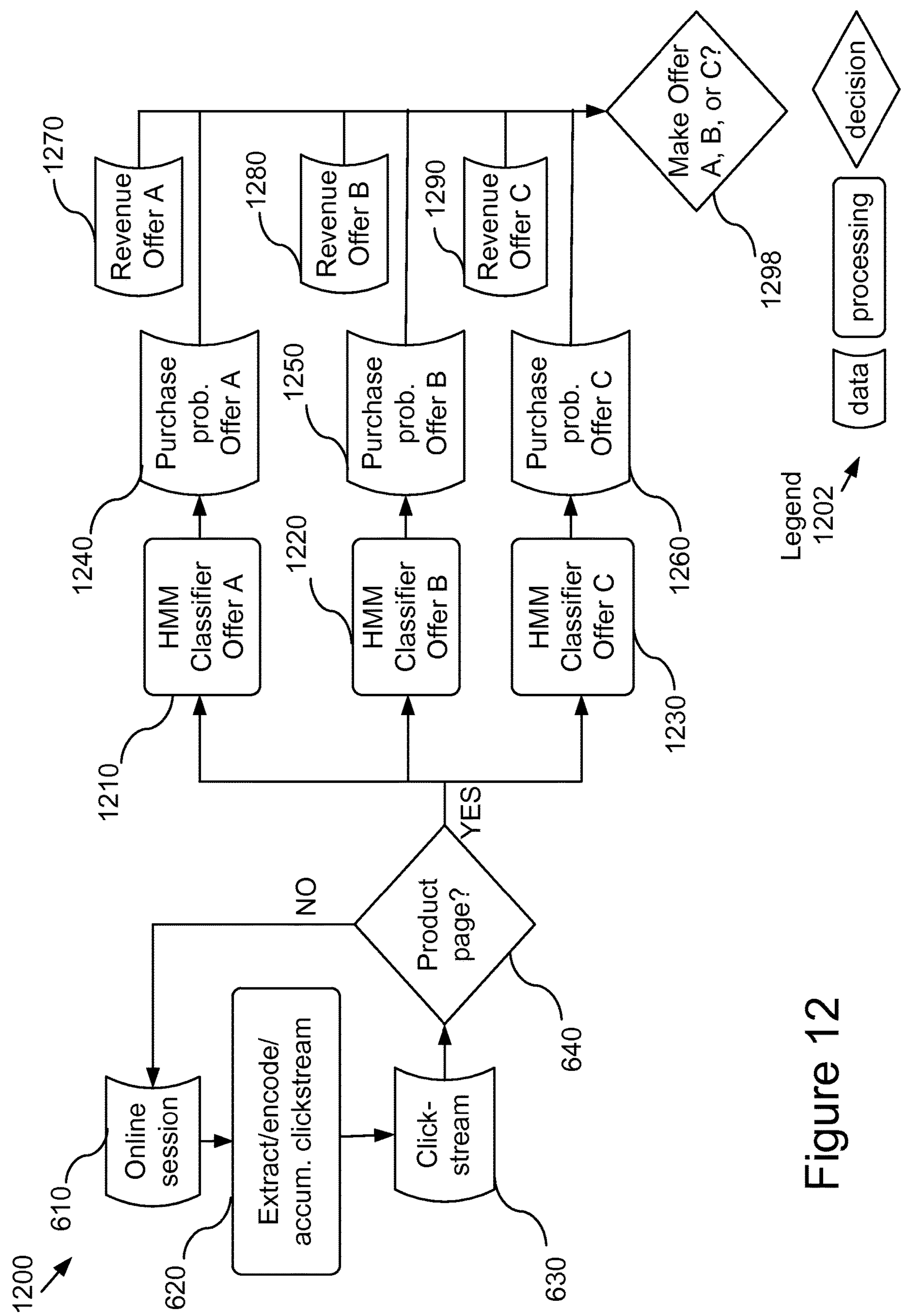
FIG. 12 is a block diagram illustrating a production phase of an example embodiment of a system employing HMMs to maximize revenue based on the purchase probability.

FIG. 12 is a block diagram illustrating an embodiment of an example production environment 1200 where HMM classifiers for offers A, B, and C are used to decide which offer to present to the user in order to maximize expected revenue. The block diagram includes a legend 1202 indicating the meaning of the shapes of the boxes in the figure. The frontend processing of the clickstream is illustrated by blocks 610, 620, 630, 640 and proceeds identically as in FIG. 6. The HMM classifiers A, B, and C, are shown as blocks 1210, 1220, and 1230 respectively in FIG. 12. Each of these blocks has the internal structure shown in block 690 in FIG. 6, but which is hidden in FIG. 12 for clarity. Block 1210 uses the HMM parameters 1140 and 1150 from FIG. 11; block 1220 uses the HMM parameters 1160 and 1170 from FIG. 11; block 1230 uses the HMM parameters 1180 and 1190 from FIG. 11.

The output from the HMM classifiers are shown as blocks 1240, 1250, and 1260. In some embodiments, these probabilities may be used to choose which of the offers A, B, and C has the highest probability of being purchased by choosing the offer with the highest probability. This will maximize the expected total number of purchases. In a different embodiment, the purchase probabilities 1240, 1250, and 1260 are coupled with their respective revenues 1270, 1280, and 1290 to choose the offer that maximizes expected total revenue, at which point the online retailer 312 may provide the offer to the user/customer 1298. The following formulas may be used.

$$\text{Expected Revenue Offer } A = P_{Offer\ A} \times \text{Revenue Offer } A$$

$$\text{Expected Revenue Offer } B = P_{Offer\ B} \times \text{Revenue Offer } B$$

$$\text{Expected Revenue Offer } C = P_{Offer\ C} \times \text{Revenue Offer } C$$

Here, $P_{Offer\ A}$ is the Offer A purchase probability 1240, $P_{Offer\ B}$ is the Offer B purchase probability 1250, and $P_{Offer\ C}$ is the Offer C purchase probability 1260. The offer with the highest expected revenue may be presented to the user in order to maximize the expected total revenue.

In the above description, for purposes of explanation, numerous specific details are set forth in order to provide a thorough understanding of the specification. It should be apparent, however, that the subject matter of the disclosure can be practiced without these specific details. In other instances, structures and devices are shown in block diagram form in order to avoid obscuring the description. For example, the present subject matter is described in an embodiment primarily with reference to user interfaces and particular hardware. However, the present subject matter applies to any type of computing system that can receive data and commands, and present information as part of a mobile device.

Reference in the specification to "one embodiment", "some embodiments", or "an embodiment" means that a particular feature, structure, or characteristic described in connection with the embodiment is included in one or more embodiments of the description. The appearances of the phrase "in one embodiment" or "in some embodiments" in various places in the specification are not necessarily all referring to the same embodiment(s).

Some portions of the detailed descriptions described above are presented in terms of algorithms and symbolic representations of operations on data bits within a computer memory. These algorithmic descriptions and representations are the means used in the data processing arts to most effectively convey the substance of their work to others. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The subject matter of the present description can take the form of an entirely hardware embodiment or an embodiment containing both hardware and software elements. In some embodiments, the subject matter may be implemented using software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the present subject matter has been presented for the purposes of illustration and description. It is not intended to be exhaustive or to limit the present embodiment of subject matter to the precise form disclosed. Many modifications and variations are possible in light of the above teaching. It is intended that the scope of the present embodiment of subject matter be limited not by this detailed description, but rather by the claims of this application. As will be understood by those familiar with the art, the present subject matter may be embodied in other specific forms without departing from the spirit or essential characteristics thereof. Likewise, the particular naming and division of the modules, routines, features, attributes, methodologies and other aspects are not mandatory or significant, and the mechanisms that implement the present subject matter or its features may have different names, divisions and/or formats. Furthermore, it should be understood that the modules, routines, features, attributes, methodologies and other aspects of the present subject matter can be implemented using hardware, firmware, software, or any combination of the three. Also, wherever a component, an example of which is a module, of the present subject matter is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present subject matter is in no way limited to implementation in any specific programming language, or for any specific operating system or environment.

What is claimed is:

1. A computer-implemented method comprising:

receiving, using one or more computing devices, current session data describing a current session for a current user, the current session including a current clickstream of the current user;

receiving, using the one or more computing devices, past clickstreams for past users reflecting past online sessions of the past users, the past clickstreams including purchase clickstreams of one or more purchasers and non-purchase clickstreams of one or more non-purchasers;

determining, using the one or more computing devices, a webpage type for each webpage visited in the past clickstreams for the past users reflecting the past online sessions of the past users;

determining, using the one or more computing devices, the webpage type for each webpage in a sequence of webpages visited in the current clickstream;

encoding, using the one or more computing devices, the past clickstreams into encoded past clickstream paths of representations of webpage types;

encoding, using the one or more computing devices, the current clickstream into an encoded current clickstream path of representations of webpage types;

deriving hidden states from the encoded past and current clickstream paths;

computing, using the one or more computing devices, an average precision score as a function of a number of hidden states used by a purchase Hidden Markov Model (HMM) and a non-purchase HMM;

determining, using the one or more computing devices, the number of hidden states corresponding to a highest value of the average precision score;

tuning, using the one or more computing devices, a hyperparameter used by the purchase HMM and the non-purchase HMM corresponding to the highest value of the average precision score, resulting in a tuned parameter;

training, using the one or more computing devices, the purchase HMM and the non-purchase HMM based on the encoded past clickstream paths, the purchase HMM being associated with a set of purchase HMM parameters and being trained by the purchase clickstreams of the one or more purchasers, the non-purchase HMM being associated with a set of non-purchase HMM parameters and being trained by the non-purchase clickstreams of the one or more non-purchasers, the purchase HMM and the non-purchase HMM having the number of hidden states based on the tuned hyperparameter, resulting in a trained purchase HMM and a trained non-purchase HMM;

generating a purchase likelihood for the current clickstream by processing the encoded current clickstream path using the trained purchase HMM associated with the set of purchase HMM parameters;

generating a non-purchase likelihood for the current clickstream by processing the encoded current clickstream path using the trained non-purchase HMM associated with the set of non-purchase HMM parameters;

computing, using the one or more computing devices, a purchase probability that the current user will purchase a product during the current session based on the purchase likelihood of the current clickstream and the non-purchase likelihood of the current clickstream, the purchase probability computationally combining the purchase likelihood of the current clickstream and the non-purchase likelihood of the current clickstream; and determining, using the one or more computing devices, an offer to present to the current user based on the purchase probability, the offer being selected from a set of offers to sell the product using an incentive.

2. The computer-implemented method of claim 1, wherein encoding the past clickstreams into the encoded past clickstream paths includes:

encoding the past clickstreams into sequences of the webpage types, the webpage types including a product-type webpage; and parsing subsequences from the encoded past clickstream paths, the subsequences ending in the product-type webpage.

3. The computer-implemented method of claim 1, wherein:

generating the purchase likelihood for the current clickstream includes calculating a first forward variable using the trained purchase HMM associated with the set of purchase HMM parameters and a Forward Recursion Algorithm;

generating the non-purchase likelihood for the current clickstream includes calculating a second forward variable using the trained non-purchase HMM associated with the set of non-purchase HMM parameters and the Forward Recursion Algorithm; and feeding the first forward variable and the second forward variable into a classifier.

4. A computer-implemented method, comprising:

receiving, using one or more computing devices, current session data describing a current session for a current user;

extracting, using the one or more computing devices, a current clickstream from the current session data;

determining, using the one or more computing devices, a webpage type for each webpage in a set of webpages visited in the current clickstream;

encoding, using the one or more computing devices, the current clickstream into an encoded current clickstream of representations of webpage types;

deriving hidden states from encoded clickstreams;

computing, using the one or more computing devices, an average precision score as a function of a number of hidden states used by a purchase Hidden Markov Model (HMM) and a non-purchase HMM;

determining, using the one or more computing devices, the number of hidden states corresponding to a highest value of the average precision score;

tuning, using the one or more computing devices, a hyperparameter used by the purchase HMM and the non-purchase HMM corresponding to the highest value of the average precision score, resulting in a tuned parameter;

generating a non-purchase likelihood for the current clickstream by processing the encoded current clickstream using the non-purchase HMM, the non-purchase HMM being associated with one or more non-purchase HMM parameters and being trained by one or more non-purchase clickstreams of one or more non-purchasers, the non-purchase HMM using the tuned hyperparameter;

generating a purchase likelihood for the current clickstream by processing the encoded current clickstream using the purchase Hidden Markov Model, the purchase HMM being associated with one or more purchase HMM parameters and being trained by one or more purchase clickstreams of one or more purchasers, the purchase HMM using the tuned hyperparameter;

computing, using the one or more computing devices, a purchase probability that the current user will purchase a product during the current session based on the non-purchase likelihood of the current clickstream and the purchase likelihood of the current clickstream, the purchase probability computationally combining the non-purchase likelihood of the current clickstream and the purchase likelihood of the current clickstream; and customizing, using the one or more computing devices, a graphical interface presented to the current user based on the purchase probability.

5. The computer-implemented method of claim 4, further comprising:

receiving, using one or more computing devices, past clickstreams for past users reflecting past online sessions of the past users, the past clickstreams including the one or more purchase clickstreams and the one or more non-purchase clickstreams;

encoding, using the one or more computing devices, the past clickstreams into encoded past clickstreams; and training, using the one or more computing devices, the purchase HMM and the non-purchase HMM using the encoded past clickstreams to determine the one or more purchase HMM parameters associated with the purchase HMM and the one or more non-purchase HMM parameters associated with the non-purchase HMM.

6. The computer-implemented method of claim 5, wherein encoding the past clickstreams into the encoded past clickstreams includes:

encoding the past clickstreams into sequences of the webpage types, the webpage types including a product-type webpage; and parsing subsequences from the encoded past clickstreams, the subsequences ending in the product-type webpage.

7. The computer-implemented method of claim 5, wherein training, using the one or more computing devices, the purchase HMM and the non-purchase HMM further includes training the purchase HMM and the non-purchase HMM using a Baum-Welch Algorithm.

8. The computer-implemented method of claim 4, wherein:

generating the non-purchase likelihood for the current clickstream includes scoring, using the one or more computing devices, the current clickstream to determine a likelihood that the current clickstream corresponds to an output of the non-purchase HMM using a Forward Recursion Algorithm; and generating the purchase likelihood for the current clickstream includes scoring, using the one or more computing devices, the current clickstream to determine a likelihood that the current clickstream corresponds to an output of the purchase HMM using the Forward Recursion Algorithm.

9. The computer-implemented method of claim 8, further comprising:

feeding, using the one or more computing devices, an output of the Forward Recursion Algorithm into a Neural Network Classifier.

10. The computer-implemented method of claim 4, further comprising:

determining, using the one or more computing devices, a customized offer to present to the current user based on the purchase probability; and presenting, using the one or more computing devices, the customized offer to the current user on a user device, the customized offer including an offer to sell the product using an incentive to the current user.

11. The computer-implemented method of claim 10, wherein the customized offer is selected from a set of possible offers based on the purchase probability and one or more of a maximum expected revenue, a maximum expected profit, and a maximum number of expected sales that would result from a sale of the product at a discounted price.

12. A computing system, comprising:

one or more processors;

one or more memories;

a production encoder module stored by the one or more memories and executable by the one or more processors to receive current session data describing a current session for a current user, extract a current clickstream from the current session data, determine a webpage type for each webpage in a set of webpages visited in the current clickstream, and encode the current clickstream into an encoded current clickstream of representations of webpage types;

an analysis module stored by the one or more memories and executable by the one or more processors to derive hidden states from encoded clickstreams and compute an average precision score as a function of a number of hidden states used by a purchase Hidden Markov Model (HMM) and a non-purchase HMM, determine the number of hidden states corresponding to a highest value of the average precision score, and tune a hyperparameter used by the purchase HMM and the non-purchase HMM corresponding to the highest value of the average precision score resulting in a tuned parameter;

a classifier stored by the one or more memories and executable by the one or more processors to generate a non-purchase likelihood for the current clickstream by processing the encoded current clickstream using the non-purchase HMM, the non-purchase HMM being associated with one or more non-purchase HMM parameters and being trained by one or more non-purchase clickstreams of one or more non-purchasers, generate a purchase likelihood for the current clickstream by processing the encoded current clickstream using a purchase Hidden Markov Model, the purchase HMM being associated with one or more purchase HMM parameters and being trained by one or more purchase clickstreams of one or more purchasers, and compute a purchase probability that the current user will purchase a product during the current session based on the non-purchase likelihood of the current clickstream and the purchase likelihood of the current clickstream, the purchase probability computationally combining the non-purchase likelihood of the current clickstream and the purchase likelihood of the current clickstream, the purchase HMM and the non-purchase HMM using the tuned hyperparameter; and an offer module stored by the one or more memories and executable by the one or more processors to customize a graphical interface presented to the current user based on the purchase probability.

13. The computing system of claim 12, further comprising:

a training encoder module stored by the one or more memories and executable by the one or more processors to receive past clickstreams for past users reflecting past online sessions of the past users, the past clickstreams including the one or more purchase clickstreams and the one or more non-purchase clickstreams, and encode the past clickstreams into encoded past clickstreams; and a Hidden Markov Model training module stored by the one or more memories and executable by the one or more processors to train the purchase HMM and the non-purchase HMM using the encoded past clickstreams to determine the one or more purchase HMM parameters associated with the purchase HMM and the one or more non-purchase HMM parameters associated with the non-purchase HMM.

14. The computing system of claim 13, wherein the training encoder module is further configured to encode the past clickstreams into sequences of the webpage types, the webpage types including a product-type webpage, and to parse subsequences from the encoded past clickstreams, the subsequences ending in the product-type webpage.

15. The computing system of claim 13, wherein the Hidden Markov Model training module is further configured to train the purchase HMM and the non-purchase HMM using a Baum-Welch Algorithm.

16. The computing system of claim 12, wherein the classifier is further configured to generate the non-purchase likelihood for the current clickstream by scoring the current clickstream to determine a likelihood that the current clickstream corresponds to an output of the non-purchase HMM using a Forward Recursion Algorithm, and generate the purchase likelihood for the current clickstream by scoring the current clickstream to determine a likelihood that the current clickstream corresponds to an output of the purchase HMM using the Forward Recursion Algorithm.

17. The computing system of claim 16, wherein the classifier is further configured to feed an output of the Forward Recursion Algorithm into a Neural Network classifier.

18. The computing system of claim 12, wherein the offer module is further configured to determine a customized offer to present to the current user based on the purchase probability and present the customized offer to the current user on a user device, the customized offer including an offer to sell the product using an incentive to the current user.

19. The computing system of claim 18, wherein the customized offer is selected from a set of possible offers based on the purchase probability and one or more of a maximum expected revenue, a maximum expected profit, and a maximum number of expected sales that would result from a sale of the product at a discounted price.

* * * * *